(12) United States Patent
Seo et al.

(10) Patent No.: US 12,358,070 B2
(45) Date of Patent: Jul. 15, 2025

(54) METHOD FOR MANUFACTURING LIQUID-COOLED JACKET

(71) Applicant: NIPPON LIGHT METAL COMPANY, LTD., Tokyo (JP)

(72) Inventors: Nobushiro Seo, Shizuoka (JP); Hisashi Hori, Shizuoka (JP)

(73) Assignee: NIPPON LIGHT METAL COMPANY, LTD., Tokyo (JP)

( * ) Notice: Subject to any disclaimer, the term of this patent is extended or adjusted under 35 U.S.C. 154(b) by 0 days.

(21) Appl. No.: 18/471,183

(22) Filed: Sep. 20, 2023

(65) Prior Publication Data

US 2024/0009753 A1  Jan. 11, 2024

Related U.S. Application Data

(62) Division of application No. 17/055,076, filed as application No. PCT/JP2019/009913 on Mar. 12, 2019, now Pat. No. 11,794,271.

(30) Foreign Application Priority Data

Jul. 19, 2018 (JP) ................. 2018-136211
Jul. 19, 2018 (JP) ................. 2018-136212

(51) Int. Cl.
  *B23K 20/00* (2006.01)
  *B23K 20/12* (2006.01)
  *B23K 103/10* (2006.01)

(52) U.S. Cl.
  CPC ...... *B23K 20/1225* (2013.01); *B23K 20/1255* (2013.01); *B23K 2103/10* (2018.08)

(58) Field of Classification Search
  CPC .............. B23K 20/1255; B23K 20/126; B23K 2101/14; B23K 20/122; B23K 20/1265;
  (Continued)

(56) References Cited

U.S. PATENT DOCUMENTS 6,191,383 B1 * 2/2001 Jense ................. F28D 1/0308
                                                        219/79
6,325,273 B1 * 12/2001 Boon ..................... B41J 2/325
                                                        228/2.1
(Continued)

FOREIGN PATENT DOCUMENTS

JP    2011-11239 A    1/2011
JP    2015-131321 A   7/2015
(Continued)

OTHER PUBLICATIONS

International Search Report for No. PCT/JP2019/009913 mailed Mar. 12, 2019.

*Primary Examiner* — Erin B Saad
(74) *Attorney, Agent, or Firm* — Merchant & Gould P.C.

(57) ABSTRACT

The present invention is characterized by including a primary joining process to perform friction stirring to a first butted portion by moving a stirring pin one round around a sealing body with a predetermined depth along a set moving track set at an inner position relative to an outer peripheral side face in a state that only the stirring pin of a rotary tool being rotated is inserted into the sealing body and that an outer circumferential face of the stirring pin is slightly in contact with a step side face of a peripheral wall step portion. In the primary joining process, after only the stirring pin being rotated is inserted into a starting position set at a position on an inner side relative to the set moving track, the stirring pin is gradually inserted to the predetermined depth while an axis of the rotary tool is moved to a position on the set moving track.

6 Claims, 15 Drawing Sheets

(58) Field of Classification Search
CPC ............ B23K 20/129; B23K 2101/045; B23K 2103/10; B23K 20/1225; B23K 20/1235; B23K 20/123; B23K 20/124; B23K 2101/36; B23K 20/12; B23K 20/2336; B23K 2101/04; B23K 2101/18; B23K 2103/18; B23K 20/1245; B23K 20/127; B23K 20/227; B23K 20/24; B23K 2101/06; B23K 2103/05; B23K 31/125; B23K 33/006; B23K 37/0235; B23K 37/0531

See application file for complete search history.

(56) References Cited

U.S. PATENT DOCUMENTS

| | | | | |
|---|---|---|---|---|
| 6,676,004 | B1* | 1/2004 | Trapp | B23K 20/1255 228/2.1 |
| 7,275,675 | B1* | 10/2007 | Carter | B23K 20/1255 228/2.1 |
| 7,494,040 | B2* | 2/2009 | Babb | B23K 20/227 228/2.1 |
| 7,857,192 | B2* | 12/2010 | Nagano | B23K 20/1255 228/2.1 |
| 8,434,661 | B2 | 5/2013 | Hovanski et al. | |
| 11,059,125 | B2 | 7/2021 | Rosal et al. | |
| 2002/0027155 | A1 | 3/2002 | Okamura et al. | |
| 2004/0084506 | A1 | 5/2004 | Tanaka et al. | |
| 2005/0011933 | A1 | 1/2005 | Grong | |
| 2005/0246884 | A1 | 11/2005 | Chen | |
| 2006/0151576 | A1* | 7/2006 | Akiyama | B23K 20/123 228/112.1 |
| 2007/0119276 | A1* | 5/2007 | Liu | C22C 29/16 75/232 |
| 2007/0241163 | A1* | 10/2007 | Valant | B23K 37/0235 228/2.1 |
| 2008/0154423 | A1* | 6/2008 | Badarinarayan | B23K 20/123 700/175 |
| 2008/0311421 | A1* | 12/2008 | Watson | B23K 20/122 428/654 |
| 2009/0065178 | A1* | 3/2009 | Kasezawa | H01L 23/473 165/104.19 |
| 2009/0108173 | A1* | 4/2009 | Kakui | B23K 26/03 250/202 |
| 2010/0101768 | A1* | 4/2010 | Seo | B23K 20/1225 29/890.038 |
| 2010/0159265 | A1* | 6/2010 | Fairchild | C22C 38/04 219/137 R |
| 2011/0308059 | A1* | 12/2011 | Seo | B23P 15/26 29/428 |
| 2012/0118937 | A1* | 5/2012 | Enzaka | B23K 20/1235 228/2.1 |
| 2015/0007912 | A1* | 1/2015 | Fujii | B23K 20/122 148/508 |
| 2016/0228981 | A1* | 8/2016 | Matsushita | B23K 20/1235 |
| 2016/0325374 | A1* | 11/2016 | Hori | B23K 20/1235 |
| 2018/0243858 | A1* | 8/2018 | Hori | B23K 20/1225 |
| 2018/0272479 | A1* | 9/2018 | Hori | B23K 20/1265 |
| 2019/0358740 | A1* | 11/2019 | Hori | B23K 20/122 |
| 2020/0147718 | A1* | 5/2020 | Hori | B23K 20/1255 |
| 2020/0324365 | A1* | 10/2020 | Hori | B23K 20/122 |
| 2021/0053144 | A1* | 2/2021 | Hori | B23P 15/26 |

FOREIGN PATENT DOCUMENTS

| | | |
|---|---|---|
| WO | 2016/163214 A1 | 10/2016 |
| WO | 2019/038938 A1 | 2/2019 |
| WO | 2019/038972 A1 | 2/2019 |

* cited by examiner

FIG. 1
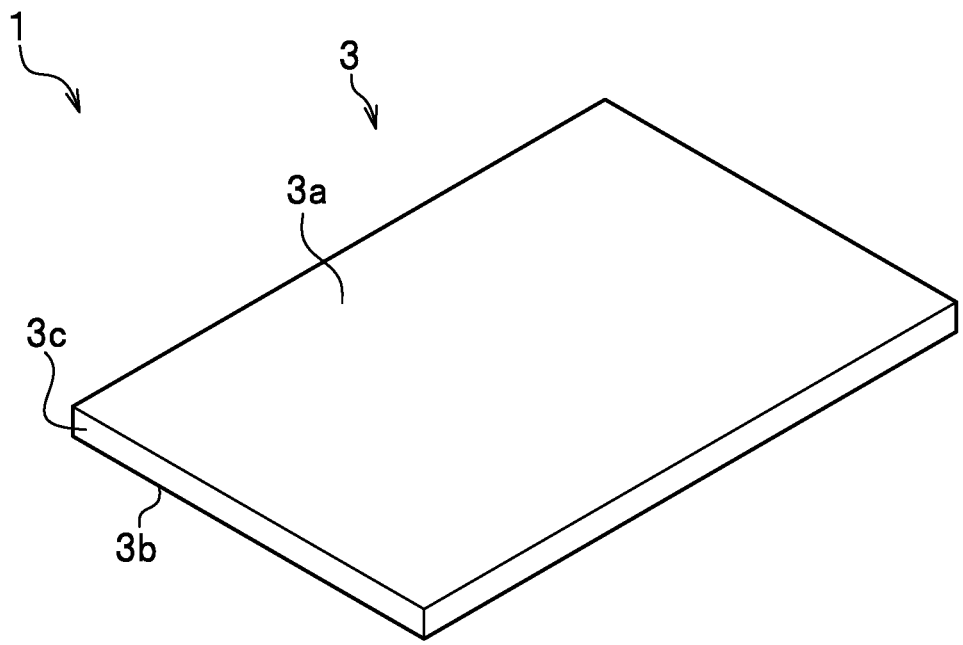
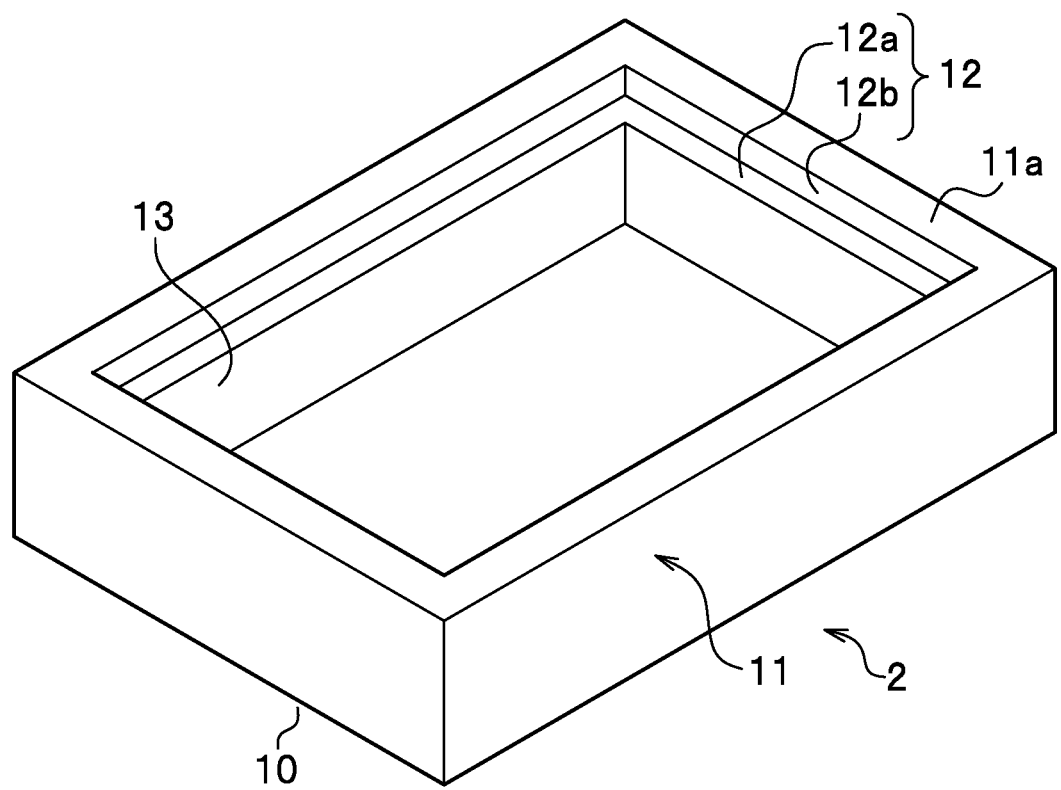

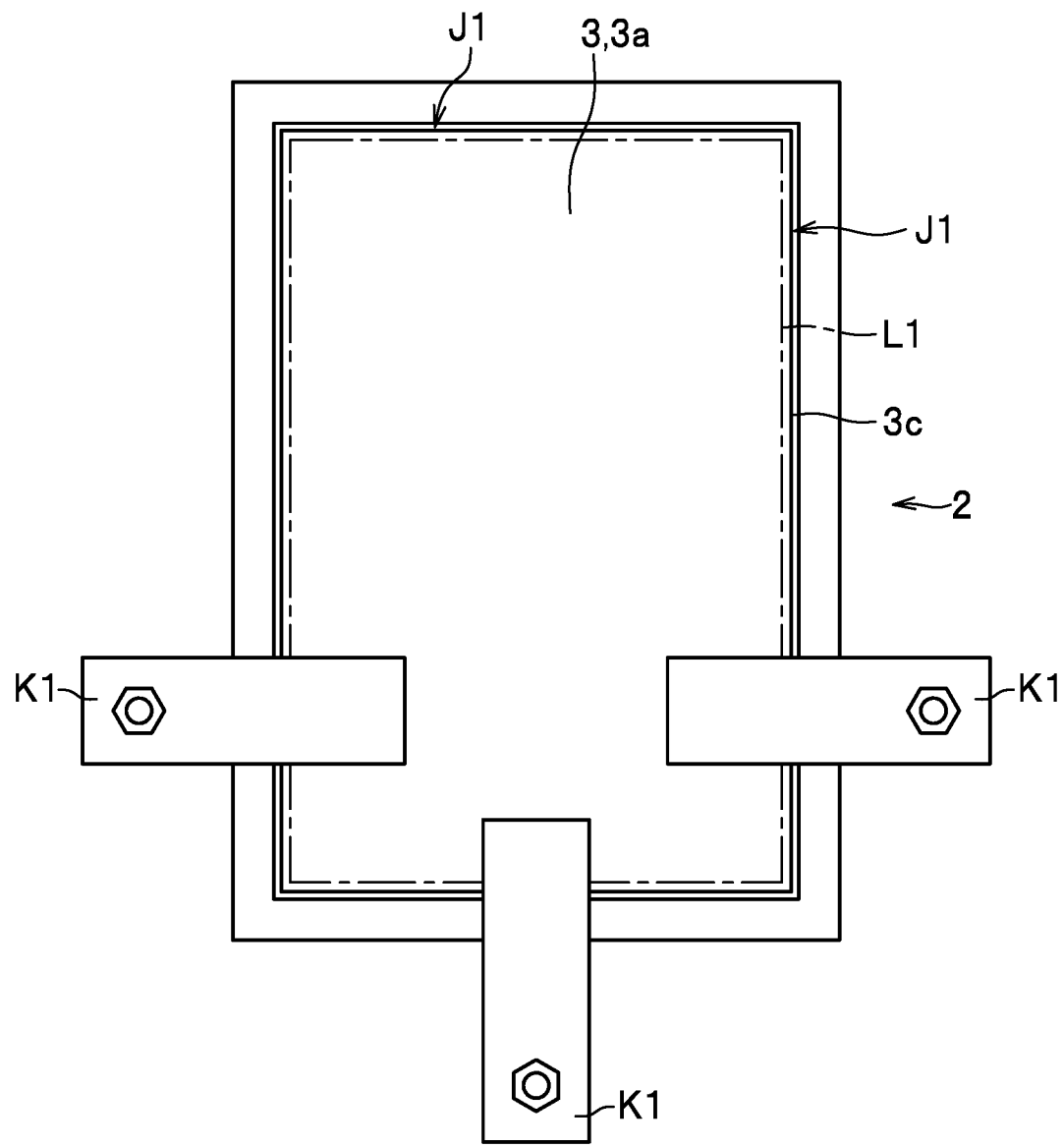

METHOD FOR MANUFACTURING LIQUID-COOLED JACKET

This application is a Division of U.S. patent application Ser. No. 17/055,076, filed Nov. 12, 2020, issued as U.S. Pat. No. 11,794,271, which is a National Stage Application of PCT/JP2019/009913, filed Mar. 12, 2019, which claims benefit of priority to Japanese Patent Application No. 2018-136211, filed Jul. 19, 2018 and Japanese Patent Application No. 2018-136212, filed Jul. 19, 2018, which applications are incorporated herein by reference. To the extent appropriate, a claim of priority is made to each of the above disclosed applications.

TECHNICAL FIELD

The present invention relates to a method for manufacturing a liquid-cooling jacket.

BACKGROUND ART

For example, a method for manufacturing a liquid-cooling jacket is disclosed in the patent literature 1. FIG. 17 is a cross sectional view showing a conventional method for manufacturing a liquid-cooling jacket. In the conventional method for manufacturing a liquid-cooling jacket, friction stir welding is performed to a butted portion J10 where a side face 102c of a sealing body 102 made of an aluminum alloy is butted against a step side face 101c of a step portion of a jacket body 101 made of an aluminum alloy. Furthermore, in the conventional method for manufacturing a liquid-cooling jacket, friction stir welding is performed in a state that only a stirring pin F2 of a rotary tool F is inserted into the butted portion J10. And further, in the conventional method for manufacturing a liquid-cooling jacket, the rotary tool F is moved in a state that an axis C of the rotary tool F is overlapped with the butted portion J10.

CITATION LIST

Patent Literature

Patent Literature 1: JP 2015-131321, A

SUMMARY OF THE INVENTION

Technical Problem

In general, the jacket body 101 tends to have a complex shape, so, for example, in some cases, the jacket body 101 is made of casting material of a 4000 series aluminum alloy, and a member having a simple shape like the sealing body 102 is made of an expansible material of a 1000 series aluminum alloy. Thus, in some cases, a liquid-cooling jacket is manufactured by joining members together, the members being made of different kinds of aluminum alloys. In such cases, in general, the jacket body 101 has a higher hardness than the sealing body 102. Hence, in a case where friction stir welding is performed in such a manner as that shown in FIG. 17, the resistance to the stirring pin F2 received from the jacket body 101 is larger than that received from the sealing body 102. As the result, it is difficult to stir different kinds of materials with good balance by the stirring pin F2 of the rotary tool F, so that there exists a problem that a cavity defect is caused in a plasticized region formed by joining to reduce the joining strength.

Furthermore, as shown in FIG. 17, when the stirring pin F2 is inserted into the butted portion J10, the stirring pin F2 is vertically inserted into the butted portion J10 to a prescribed depth. For this reason, frictional heat is too much generated at a starting position of the friction stirring. On the other hand, when the stirring pin F2 is made to leave the butted portion J10, the stirring pin F2 is vertically pulled out. Therefore, frictional heat is too much generated at an ending position of the friction stirring. Thus, metal of the jacket body 101 side tends to mix into the sealing body 102 side at the starting position and the ending position. Therefore, there exists a problem to contribute to a poor joint.

From such a view point, it is an object of the present invention to provide a method for manufacturing a liquid-cooling jacket, the method being capable of appropriately joining different kinds of aluminum alloys.

Solution to Problem

In order to solve the problem, the present invention is characterized by a method for manufacturing a liquid-cooling jacket to be constituted by a jacket body and a sealing body, the jacket body having a bottom portion and a peripheral wall portion standing on a peripheral edge of the bottom portion, the sealing body sealing an opening portion of the jacket body, the method including joining the jacket body and the sealing body together by friction stirring, wherein the jacket body is made of a first aluminum alloy, and the sealing body is made of a second aluminum alloy, the first aluminum alloy having a higher hardness than the second aluminum alloy, and wherein an outer circumferential face of a stirring pin of a rotary tool to be used in the friction stirring has a tapered shape in which a diameter of the stirring pin is reduced toward a tip of the stirring pin, the method comprising: a preparation process to form a peripheral wall step portion having a step bottom face and a step side face standing on the step bottom face toward the opening portion along an inner peripheral edge of the peripheral wall portion and to form the sealing body so that a thickness of the sealing body is larger than a height dimension of the step side face of the peripheral wall step portion; a placing process to place the sealing body on the jacket body to form a first butted portion where an outer peripheral side face of the sealing body is butted against the step side face of the peripheral wall step portion while forming a second butted portion where a back face of the sealing body and the step bottom face of the peripheral wall step portion are overlapped with each other; and a primary joining process to perform friction stirring to the first butted portion by moving the stirring pin of the rotary tool one round around the sealing body with a predetermined depth along a set moving track set at an inner position relative to the outer peripheral side face of the sealing body in a state that only the stirring pin of the rotary tool being rotated is inserted into the sealing body and that an outer circumferential face of the stirring pin is slightly in contact with the step side face of the peripheral wall step portion, wherein in the primary joining process, after only the stirring pin being rotated is inserted into a starting position set at a position on an inner side relative to the set moving track, the stirring pin is gradually inserted to the predetermined depth while an axis of the rotary tool is moved to a position on the set moving track.

Furthermore, the present invention is characterized by a method for manufacturing a liquid-cooling jacket to be constituted by a jacket body and a sealing body, the jacket body having a bottom portion and a peripheral wall portion standing on a peripheral edge of the bottom portion, the sealing body sealing an opening portion of the jacket body, the method including joining the jacket body and the sealing body together by friction stirring, wherein the jacket body is made of a first aluminum alloy, and the sealing body is made of a second aluminum alloy, the first aluminum alloy having a higher hardness than the second aluminum alloy, and wherein an outer circumferential face of a stirring pin of a rotary tool to be used in the friction stirring has a tapered shape in which a diameter of the stirring pin is reduced toward a tip of the stirring pin, the method comprising: a preparation process to form a peripheral wall step portion having a step bottom face and a step side face standing on the step bottom face toward the opening portion along an inner peripheral edge of the peripheral wall portion and to form the sealing body so that a thickness of the sealing body is larger than a height dimension of the step side face of the peripheral wall step portion; a placing process to place the sealing body on the jacket body to form a first butted portion where an outer peripheral side face of the sealing body is butted against the step side face of the peripheral wall step portion while forming a second butted portion where a back face of the sealing body and the step bottom face of the peripheral wall step portion are overlapped with each other; and a primary joining process to perform friction stirring to the first butted portion by moving the stirring pin of the rotary tool one round around the sealing body with a predetermined depth along a set moving track set at an inner position relative to the outer peripheral side face of the sealing body in a state that only the stirring pin of the rotary tool being rotated is inserted into the sealing body and that an outer circumferential face of the stirring pin is slightly in contact with the step side face of the peripheral wall step portion, wherein in the primary joining process, the stirring pin is inserted into a starting position set on the set moving track, and is gradually inserted to the predetermined depth while being moved in an advancing direction.

According to such manufacturing methods, the second aluminum alloy on the sealing body side of the first butted portion is mainly stirred to be plastically fluidized because of frictional heat between the sealing body and the stirring pin. As a result, in the first butted portion, the step side face and the outer peripheral side face of the sealing body are joined. Furthermore, since the outer circumferential face of the stirring pin is slightly contact with the step side face of the jacket body, mixing amount of the first aluminum alloy into the sealing body from the jacket body can be minimized. Hereby, since the second aluminum alloy on the sealing body side of the first butted portion is mainly frictionally stirred, the joining strength can be suppressed from lowering. And, since the stirring pin is gradually inserted to the predetermined depth while the axis of the rotary tool is moved to a position on the set moving track, frictional heat on the set moving track is prevented from being excessively generated.

Further, the present invention is characterized by a method for manufacturing a liquid-cooling jacket to be constituted by a jacket body and a sealing body, the jacket body having a bottom portion and a peripheral wall portion standing on a peripheral edge of the bottom portion, the sealing body sealing an opening portion of the jacket body, the method including joining the jacket body and the sealing body together by friction stirring, wherein the jacket body is made of a first aluminum alloy, and the sealing body is made of a second aluminum alloy, the first aluminum alloy having a higher hardness than the second aluminum alloy, and wherein an outer circumferential face of a stirring pin of a rotary tool to be used in the friction stirring has a tapered shape in which a diameter of the stirring pin is reduced toward a tip of the stirring pin, the method comprising: a preparation process to form a peripheral wall step portion having a step bottom face and a step side face standing on the step bottom face toward the opening portion along an inner peripheral edge of the peripheral wall portion and to form the sealing body so that a thickness of the sealing body is larger than a height dimension of the step side face of the peripheral wall step portion; a placing process to place the sealing body on the jacket body to form a first butted portion where an outer peripheral side face of the sealing body is butted against the step side face of the peripheral wall step portion while forming a second butted portion where a back face of the sealing body and the step bottom face of the peripheral wall step portion are overlapped with each other; and a primary joining process to perform friction stirring to the first butted portion by moving the stirring pin of the rotary tool one round around the sealing body with a predetermined depth along a set moving track set at an inner position relative to the outer peripheral side face of the sealing body in a state that only the stirring pin of the rotary tool being rotated is inserted into the sealing body and that an outer circumferential face of the stirring pin is slightly in contact with the step side face of the peripheral wall step portion, wherein in the primary joining process, a first region and a second region are set in the first butted portion, wherein a first primary joining process that friction stirring is performed to the first region after clamping the jacket body and the sealing body in the second region and a second primary joining process that friction stirring is performed to the second region after clamping the jacket body and the sealing body in the first region are performed, and wherein in the first primary joining process and the second primary joining process, after only the stirring pin being rotated is inserted into a starting position set at a position on an inner side relative to the set moving track, the stirring pin is gradually inserted to the predetermined depth while an axis of the rotary tool is moved to a position on the set moving track.

And furthermore, the present invention is characterized by a method for manufacturing a liquid-cooling jacket to be constituted by a jacket body and a sealing body, the jacket body having a bottom portion and a peripheral wall portion standing on a peripheral edge of the bottom portion, the sealing body sealing an opening portion of the jacket body, the method including joining the jacket body and the sealing body together by friction stirring, wherein the jacket body is made of a first aluminum alloy, and the sealing body is made of a second aluminum alloy, the first aluminum alloy having a higher hardness than the second aluminum alloy, and wherein an outer circumferential face of a stirring pin of a rotary tool to be used in the friction stirring has a tapered shape in which a diameter of the stirring pin is reduced toward a tip of the stirring pin, the method comprising: a preparation process to form a peripheral wall step portion having a step bottom face and a step side face standing on the step bottom face toward the opening portion along an inner peripheral edge of the peripheral wall portion and to form the sealing body so that a thickness of the sealing body is larger than a height dimension of the step side face of the peripheral wall step portion; a placing process to place the sealing body on the jacket body to form a first butted portion where an outer peripheral side face of the sealing body is butted against the step side face of the peripheral wall step portion while forming a second butted portion where a back face of the sealing body and the step bottom face of the peripheral wall step portion are overlapped with each other; and a primary joining process to perform friction stirring to the first butted portion by moving the stirring pin of the rotary tool one round around the sealing body with a predetermined depth along a set moving track set at an inner position relative to the outer peripheral side face of the sealing body in a state that only the stirring pin of the rotary tool being rotated is inserted into the sealing body and that an outer circumferential face of the stirring pin is slightly in contact with the step side face of the peripheral wall step portion, wherein in the primary joining process, a first region and a second region are set in the first butted portion, wherein a first primary joining process that friction stirring is performed to the first region after clamping the jacket body and the sealing body in the second region and a second primary joining process that friction stirring is performed to the second region after clamping the jacket body and the sealing body in the first region are performed, and wherein in the first primary joining process and the second primary joining process, the stirring pin is inserted into a starting position set at a position on the set moving track, and is gradually inserted to the predetermined depth while being moved in an advancing direction.

According to such manufacturing methods, the second aluminum alloy on the sealing body side of the first butted portion is mainly frictionally stirred to be plastically fluidized because of frictional heat between the sealing body and the stirring pin. As a result, in the first butted portion, the step side face and the outer peripheral side face of the sealing body are joined. Furthermore, since the outer circumferential face of the stirring pin is slightly contact with the step side face of the jacket body, mixing amount of the first aluminum alloy into the sealing body from the jacket body can be minimized. Hereby, since the second aluminum alloy on the sealing body side of the first butted portion is mainly frictionally stirred, the joining strength can be suppressed from lowering. And, since the stirring pin is gradually inserted to the predetermined depth while the axis of the rotary tool is moved on the set moving track, frictional heat on the set moving track is prevented from being excessively generated. Further, friction stirring is efficiently performed since a position to be clamped in the jacket body and the sealing body and a position to be frictionally stirred in the jacket body and the sealing body are changed in the primary joining process.

It is preferable that the predetermined depth in the primary joining process is set so that the stirring pin is slightly brought in contact with the step bottom face of the peripheral wall step portion.

According to such a manufacturing method, the first aluminum alloy is prevented from mixing into the sealing body as much as possible and the joining strength of the second butted portion can be enhanced.

It is preferable that in the primary joining process, friction stirring is performed while the stirring pin is rotated at a predetermined rotational speed and that the stirring pin is inserted while being rotated at a rotational speed higher than the predetermined rotational speed when the stirring pin is inserted in the primary joining process, and is moved to the set moving track while the rotational speed is gradually decreased.

According to such a manufacturing method, friction stirring is more preferably performed.

It is preferable that in the preparation process, the peripheral wall step portion is formed to have the step bottom face and the step side face on the inner peripheral edge of the peripheral wall portion, the step side face obliquely standing on the step bottom face toward the opening portion and toward the outside.

According to such a manufacturing method, joining is reliably performed while avoiding excessive contact between the rotary tool and the step side face.

It is preferable that a thickness of the sealing body is set to be larger than a height dimension of the step side face of the peripheral wall step portion.

According to such a manufacturing method, metal shortage in the joined portion can be compensated.

It is preferable that in the preparation process, the jacket body is formed by die-casting and at least the sealing body is formed to have a convex front face.

According to such a manufacturing method, by forming the front face of the sealing body to be convex in advance, the liquid-cooling jacket can be manufactured to be flat with use of heat contraction based on frictional heat.

It is preferable that the method further comprises a provisional joining process where provisional joining is performed to the first butted portion before the primary joining process.

According to such a manufacturing method, opening in the first butted portion can be prevented in the primary joining process.

Furthermore, the present invention is characterized by a method for manufacturing a liquid-cooling jacket to be constituted by a jacket body and a sealing body, the jacket body having a bottom portion and a peripheral wall portion standing on a peripheral edge of the bottom portion, the sealing body sealing an opening portion of the jacket body, the method including joining the jacket body and the sealing body together by friction stirring, wherein the jacket body is made of a first aluminum alloy, and the sealing body is made of a second aluminum alloy, the first aluminum alloy having a higher hardness than the second aluminum alloy, and wherein an outer circumferential face of a stirring pin of a rotary tool to be used in the frictional stirring has a tapered shape in which a diameter of the stirring pin is reduced toward a tip of the stirring pin, the method comprising: a preparation process to form a peripheral wall step portion having a step bottom face and a step side face standing on the step bottom face toward the opening portion along an inner peripheral edge of the peripheral wall portion and to form the sealing body so that a thickness of the sealing body is larger than a height dimension of the step side face of the peripheral wall step portion; a placing process to place the sealing body on the jacket body to form a first butted portion where an outer peripheral side face of the sealing body is butted against the step side face of the peripheral wall step portion while forming a second butted portion where a back face of the sealing body and the step bottom face of the peripheral wall step portion are overlapped with each other; and a primary joining process to perform friction stirring to the first butted portion by moving the stirring pin of the rotary tool one round around the sealing body with a predetermined depth along a set moving track set at an inner position relative to the outer peripheral side face of the sealing body in a state that only the stirring pin of the rotary tool being rotated is inserted into the sealing body and that an outer circumferential face of the stirring pin is slightly in contact with the step side face of the peripheral wall step portion, wherein in the primary joining process, an ending position is set at a position on an inner side relative to the set moving track, after friction stir welding is performed to the first butted portion, the stirring pin is gradually moved upward while the rotary tool is moved to the ending position, and the rotary tool is made to leave the sealing body at the ending position.

And the present invention is characterized by a method for manufacturing a liquid-cooling jacket to be constituted by a jacket body and a sealing body, the jacket body having a bottom portion and a peripheral wall portion standing on a peripheral edge of the bottom portion, the sealing body sealing an opening portion of the jacket body, the method including joining the jacket body and the sealing body together by friction stirring, wherein the jacket body is made of a first aluminum alloy, and the sealing body is made of a second aluminum alloy, the first aluminum alloy having a higher hardness than the second aluminum alloy, and wherein an outer circumferential face of a stirring pin of a rotary tool to be used in the frictional stirring has a tapered shape in which a diameter of the stirring pin is reduced toward a tip of the stirring pin, the method comprising: a preparation process to form a peripheral wall step portion having a step bottom face and a step side face standing on the step bottom face toward the opening portion along an inner peripheral edge of the peripheral wall portion and to form the sealing body so that a thickness of the sealing body is larger than a height dimension of the step side face of the peripheral wall step portion; a placing process to place the sealing body on the jacket body to form a first butted portion where an outer peripheral side face of the sealing body is butted against the step side face of the peripheral wall step portion while forming a second butted portion where a back face of the sealing body and the step bottom face of the peripheral wall step portion are overlapped with each other; and a primary joining process to perform friction stirring to the first butted portion by moving the stirring pin of the rotary tool one round around the sealing body with a predetermined depth along a set moving track set at an inner position relative to the outer peripheral side face of the sealing body in a state that only the stirring pin of the rotary tool being rotated is inserted into the sealing body and that an outer circumferential face of the stirring pin is slightly in contact with the step side face of the peripheral wall step portion, wherein in the primary joining process, an ending position is set at a position on the set moving track, after friction stir welding is performed to the first butted portion, the stirring pin is gradually moved upward while the rotary tool is moved to the ending position, and the rotary tool is made to leave the sealing body at the ending position.

According to such manufacturing methods, the second aluminum alloy on the sealing body side of the first butted portion is mainly frictionally stirred to be plastically fluidized because of frictional heat between the sealing body and the stirring pin. As a result, in the first butted portion, the step side face and the outer peripheral side face of the sealing body are joined. Furthermore, since the outer circumferential face of the stirring pin is slightly contact with the step side face of the jacket body, mixing amount of the first aluminum alloy into the sealing body from the jacket body can be minimized. Hereby, since the second aluminum alloy on the sealing body side of the first butted portion is mainly frictionally stirred, the joining strength can be suppressed from lowering. And, since the stirring pin is gradually moved upward while the rotary tool is moved to the ending position, frictional heat on the set moving track is prevented from being excessively generated.

Furthermore, the present invention is characterized by a method for manufacturing a liquid-cooling jacket to be constituted by a jacket body and a sealing body, the jacket body having a bottom portion and a peripheral wall portion standing on a peripheral edge of the bottom portion, the sealing body sealing an opening portion of the jacket body, the method including joining the jacket body and the sealing body together by friction stirring, wherein the jacket body is made of a first aluminum alloy, and the sealing body is made of a second aluminum alloy, the first aluminum alloy having a higher hardness than the second aluminum alloy, and wherein an outer circumferential face of a stirring pin of a rotary tool to be used in the frictional stirring has a tapered shape in which a diameter of the stirring pin is reduced toward a tip of the stirring pin, the method comprising: a preparation process to form a peripheral wall step portion having a step bottom face and a step side face standing on the step bottom face toward the opening portion along an inner peripheral edge of the peripheral wall portion and to form the sealing body so that a thickness of the sealing body is larger than a height dimension of the step side face of the peripheral wall step portion; a placing process to place the sealing body on the jacket body to form a first butted portion where an outer peripheral side face of the sealing body is butted against the step side face of the peripheral wall step portion while forming a second butted portion where a back face of the sealing body and the step bottom face of the peripheral wall step portion are overlapped with each other; and a primary joining process to perform friction stirring to the first butted portion by moving the stirring pin of the rotary tool one round around the sealing body with a predetermined depth along a set moving track set at an inner position relative to the outer peripheral side face of the sealing body in a state that only the stirring pin of the rotary tool being rotated is inserted into the sealing body and that an outer circumferential face of the stirring pin is slightly in contact with the step side face of the peripheral wall step portion, wherein in the primary joining process, a first region and a second region are set in the first butted portion, wherein a first primary joining process that friction stirring is performed to the first region after clamping the jacket body and the sealing body in the second region and a second primary joining process that friction stirring is performed to the second region after clamping the jacket body and the sealing body in the first region are performed, and wherein in the first primary joining process and the second primary joining process, an ending position is set at a position on an inner side relative to the set moving track, after friction stir welding is performed to the first butted portion, the stirring pin is gradually moved upward while the rotary tool is moved to the ending position, and the rotary tool is made to leave the sealing body at the ending position.

And furthermore, the present invention is characterized by a method for manufacturing a liquid-cooling jacket to be constituted by a jacket body and a sealing body, the jacket body having a bottom portion and a peripheral wall portion standing on a peripheral edge of the bottom portion, the sealing body sealing an opening portion of the jacket body, the method including joining the jacket body and the sealing body together by friction stirring, wherein the jacket body is made of a first aluminum alloy, and the sealing body is made of a second aluminum alloy, the first aluminum alloy having a higher hardness than the second aluminum alloy, and wherein an outer circumferential face of a stirring pin of a rotary tool to be used in the frictional stirring has a tapered shape in which a diameter of the stirring pin is reduced toward a tip of the stirring pin, the method comprising: a preparation process to form a peripheral wall step portion having a step bottom face and a step side face standing on the step bottom face toward the opening portion along an inner peripheral edge of the peripheral wall portion and to form the sealing body so that a thickness of the sealing body is larger than a height dimension of the step side face of the peripheral wall step portion; a placing process to place the sealing body on the jacket body to form a first butted portion where an outer peripheral side face of the sealing body is butted against the step side face of the peripheral wall step portion while forming a second butted portion where a back face of the sealing body and the step bottom face of the peripheral wall step portion are overlapped with each other; and a primary joining process to perform friction stirring to the first butted portion by moving the stirring pin of the rotary tool one round around the sealing body with a predetermined depth along a set moving track set at an inner position relative to the outer peripheral side face of the sealing body in a state that only the stirring pin of the rotary tool being rotated is inserted into the sealing body and that an outer circumferential face of the stirring pin is slightly in contact with the step side face of the peripheral wall step portion, wherein in the primary joining process, a first region and a second region are set in the first butted portion, wherein a first primary joining process that friction stirring is performed to the first region after clamping the jacket body and the sealing body in the second region and a second primary joining process that friction stirring is performed to the second region after clamping the jacket body and the sealing body in the first region are performed, and wherein in the first primary joining process and the second primary joining process, an ending position is set at a position on the set moving track, after friction stir welding is performed to the first butted portion, the stirring pin is gradually moved upward while the rotary tool is moved to the ending position, and the rotary tool is made to leave the sealing body at the ending position.

According to such manufacturing methods, the second aluminum alloy on the sealing body side of the first butted portion is mainly frictionally stirred to be plastically fluidized because of frictional heat between the sealing body and the stirring pin. As a result, in the first butted portion, the step side face and the outer peripheral side face of the sealing body are joined. Furthermore, since the outer circumferential face of the stirring pin is slightly contact with the step side face of the jacket body, mixing amount of the first aluminum alloy into the sealing body from the jacket body can be minimized. Hereby, since the second aluminum alloy on the sealing body side of the first butted portion is mainly frictionally stirred, the joining strength can be suppressed from lowering. And, since the stirring pin is gradually moved upward while the rotary tool is moved to the ending position, frictional heat on the set moving track is prevented from being excessively generated. Further, friction stirring is efficiently performed since a position to be clamped in the jacket body and the sealing body and a position to be frictionally stirred in the jacket body and the sealing body are changed in the primary joining process.

It is preferable that the predetermined depth in the primary joining process is set at a position where the stirring pin is slightly brought in contact with the step bottom face of the peripheral wall step portion.

According to such a manufacturing method, the first aluminum alloy is prevented from mixing into the sealing body as much as possible and the joining strength of the second butted portion can be enhanced.

It is preferable that in the primary joining process, friction stirring is performed while the stirring pin is rotated at a predetermined rotational speed, and when the stirring pin is made to leave in the primary joining process, the rotary tool is moved to the ending position while gradually increasing a rotational speed of the rotary tool from the predetermined rotational speed.

According to such a manufacturing method, friction stirring is more preferably performed.

It is preferable that in the preparation process, the peripheral wall step portion is formed to have the step bottom face and the step side face on the inner peripheral edge of the peripheral wall portion, the step side face obliquely standing on the step bottom face toward the opening portion and toward the outside.

According to such a manufacturing method, joining is reliably performed while avoiding excessive contact between the rotary tool and the step side face.

It is preferable that a thickness of the sealing body is set to be larger than a height dimension of the step side face of the peripheral wall step portion.

According to such a manufacturing method, metal shortage in the joined portion can be compensated.

It is preferable that in the preparation process, the jacket body is formed by die-casting and at least the sealing body is formed to have a convex front face.

According to such a manufacturing method, by forming the front face of the jacket body to be convex in advance, the liquid-cooling jacket can be manufactured to be flat with use of heat contraction based on frictional heat.

It is preferable that the method comprises a provisional process where provisional joining is performed to the first butted portion before the primary joining process.

According to such a manufacturing method, opening in the first butted portion can be prevented in the primary joining process.

Advantageous Effects of Invention

According to the method for manufacturing a liquid-cooling jacket according to the present invention, different kinds of aluminum alloys can be appropriately joined.

BRIEF DESCRIPTION OF THE DRAWINGS

FIG. 1 is an exploded perspective view showing a liquid-cooling jacket according to a first embodiment of the present invention;

FIG. 4 is a plan view showing a set moving track of the liquid-cooling jacket according to the first embodiment;

DESCRIPTION OF EMBODIMENTS

First Embodiment

Figure 2:
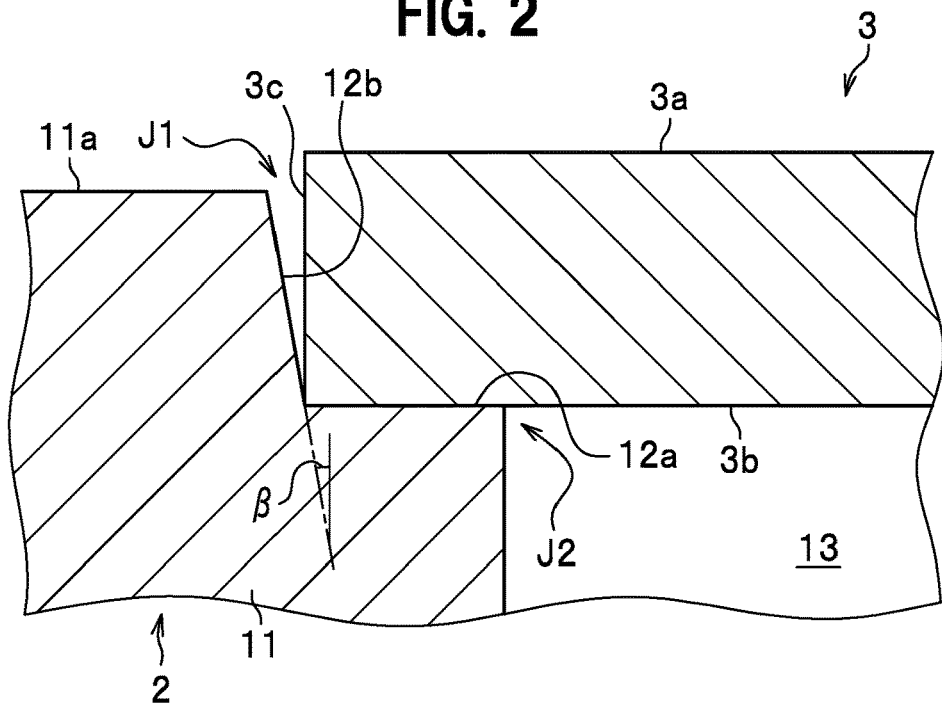
FIG. 2 is a cross sectional view showing a placing process of a method for manufacturing the liquid-cooling jacket according to the first embodiment.

An embodiment of the present invention will be described appropriately with reference to Figures. As shown in FIG. 1, a liquid-cooling jacket 1 according to a first embodiment is composed of a jacket body 2 and a sealing body 3. The liquid-cooling jacket 1 is a device to cool a heating element placed thereon by flowing a fluid through the liquid-cooling jacket 1. The jacket body 2 and the sealing body 3 are integrated together by friction stir welding. Note that, hereinafter, a "front face" means the face opposite to a "back face".

The jacket body 2 is mainly composed of a bottom portion 10 and a peripheral wall portion 11. The material of the jacket body 2 is not particularly limited so long as it is a metal capable of being frictionally stirred, and in this embodiment, the jacket body 2 is made of mainly a first aluminum alloy. The first aluminum alloy is, for example, an aluminum alloy casting material such as JISH5302 ADC12 (based on Al—Si—Cu).

The bottom portion 10 is a plate-like member having a rectangular shape. The peripheral wall portion 11 is a wall portion standing on the peripheral edge portion of the bottom portion and having a rectangular frame shape. A recessed portion 13 is defined by the bottom portion 10 and the peripheral wall portion 11. A peripheral wall step portion 12 is formed at an inner peripheral edge of the peripheral wall portion 11. The peripheral wall step portion 12 is composed of a step bottom face 12a and a step side face 12b obliquely standing up from the step bottom face 12a. As shown in FIG. 2, an inclination angle β of the step side face 12b may be appropriately set, and in the embodiment, it is the same as an inclination angle α of a stirring pin F2 of a rotary tool F shown in FIG. 6.

Note that, the step side face 12b may stand up orthogonally to the step bottom face 12a. Furthermore, the jacket body 2 of the embodiment is integrally formed, but may be integrated by joining plural elements making up the peripheral wall portion 11 with a sealing agent or the like.

The sealing body 3 is a member to seal an opening portion of the jacket body 2. The sealing body 3 is not particularly limited so long as it is made of a metal capable of being frictionally stirred. In the embodiment, it is made of mainly a second aluminum alloy. The second aluminum alloy has a lower hardness than the first aluminum alloy. The second aluminum alloy is, for example, an aluminum alloy expansible material such as JIS A1050, A1100, A6063.

Next, a method for manufacturing the liquid-cooling jacket according to the embodiment will be described. In the method for manufacturing the liquid-cooling jacket according to the embodiment, a preparation process, a placing process and a primary joining process are performed.

The preparation process is a process to prepare the jacket body 2 and the sealing body 3. A method for manufacturing the jacket body 2 and the sealing body 3 is not particularly limited. For example, the jacket body 2 is formed by die-casting, and the sealing body 3 is formed by extrusion.

The placing process is a process to place the sealing body 3 on the jacket body 2 as shown in FIG. 2. An outer peripheral side face 3c of the sealing body 3 is butted against the step side face 12b of the peripheral wall step portion 12 by the placing process to form a first butted portion J1. Since the step side face 12b is inclined toward the outside, a V-shaped cross sectional gap is formed at the first butted portion J1. The first butted portion J1 has a rectangular shape along the periphery of the sealing body 3 in a plan view. Furthermore, a back face 3b of the sealing body 3 is butted against the step bottom face 12a of the peripheral wall step portion 12 to form a second butted portion J2. The thickness of the sealing body 3 may be appropriately set, and in the embodiment, it is larger than the height dimension of the step side face 12b.

Figure 3:
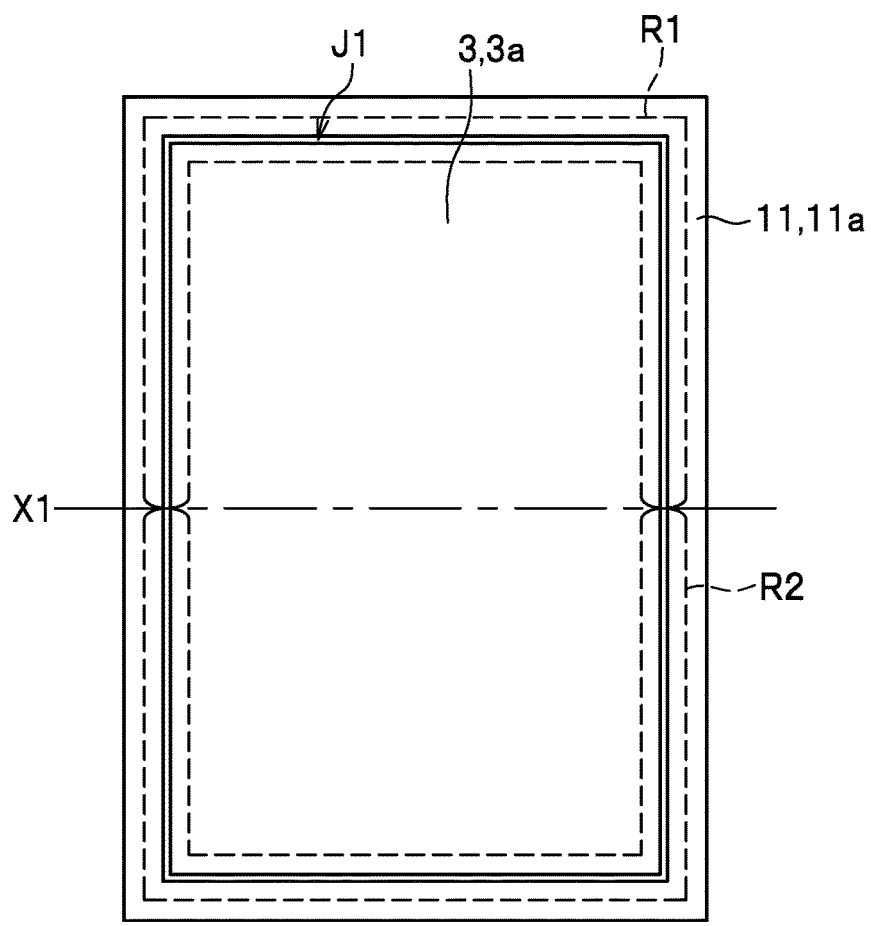
FIG. 3 is a plan view showing a first region and a second region of the liquid-cooling jacket according to the first embodiment.

As shown in FIG. 3, in the first butted portion J1, one side region (in FIG. 3, upper side region) with respect to a middle line X1 set on the sealing body 3 is referred as a first region R1. And the other side region (in FIG. 3, lower side region) with respect to the middle line X1 is referred to as a second region R2. The middle line X1 is a line at the middle position of the sealing body 3 in a longitudinal direction.

As shown in FIG. 4, after the sealing body 3 is placed on the jacket body 2, the jacket body 2 and the sealing body 3 according to the second region R2 (refer to FIG. 3) are clamped not to move with three clamps K1. Furthermore, a "set moving track L1" (dash-dotted line) is set on an inner side relative to the first butted portion J1. The set moving track L1 is a moving track of the rotary tool F necessary for joining the first butted portion J1 in a primary joining process to be described later. Since the stirring pin F2 is slightly brought in contact with the step side face 12b in the embodiment as described later, the set moving track L1 is set to be a rectangular shape in a plan view on the inner side relative to the outer peripheral side face 3c.

Figure 5A:
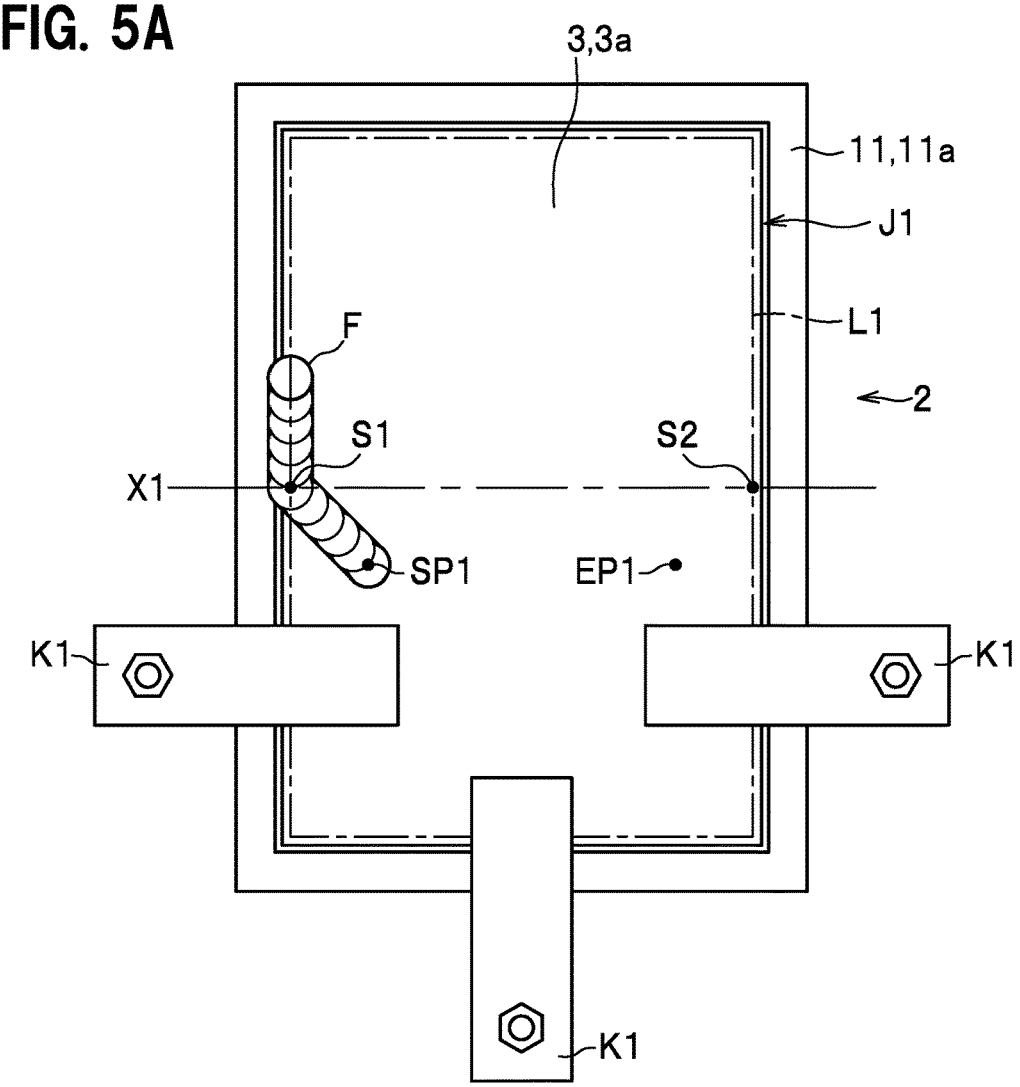
FIG. 5A is a plan view showing a first primary joining process of the method for manufacturing the liquid-cooling jacket according to the first embodiment.
Figure 6:
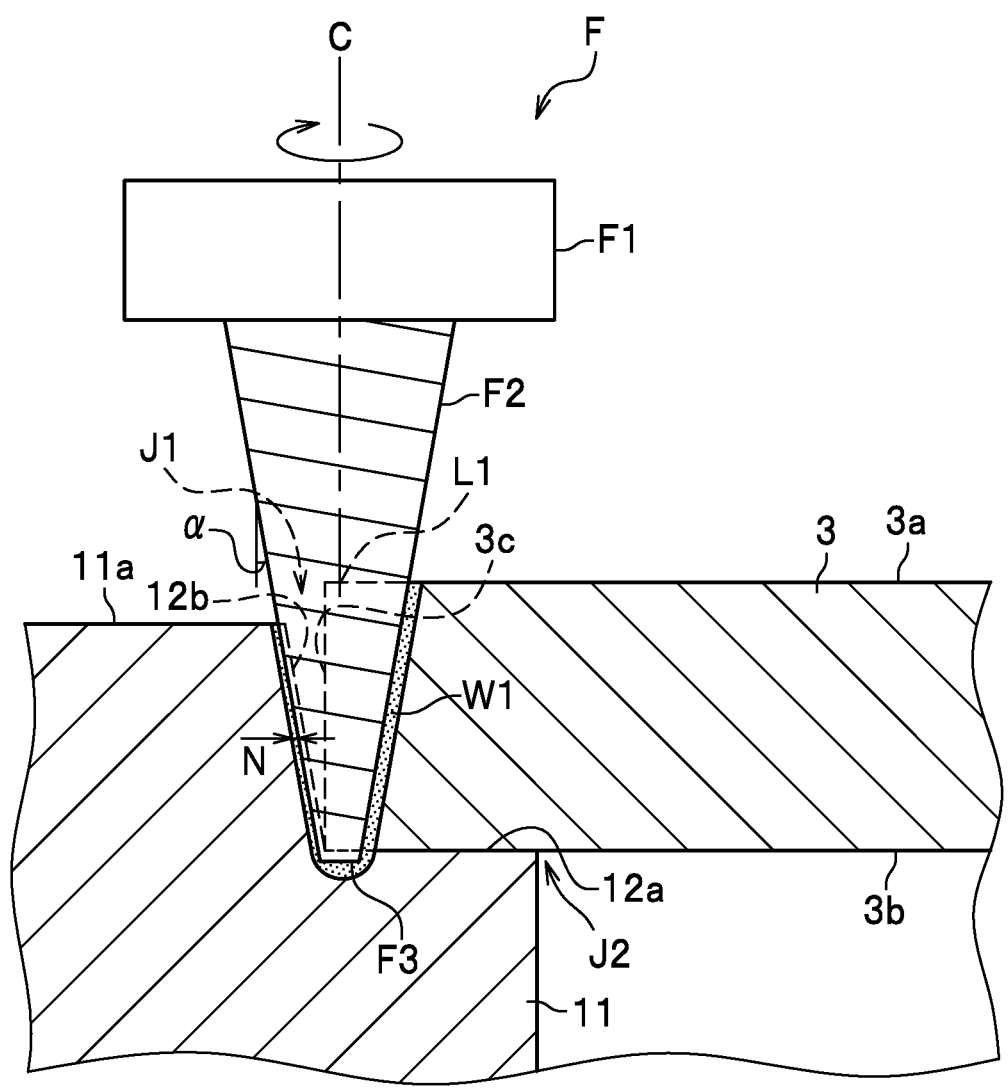
FIG. 6 is a cross sectional view showing the first primary joining process of the method for manufacturing the liquid-cooling jacket according to the first embodiment.

As shown in FIGS. 5A, 6, the primary joining process is a process where friction stir welding is performed to the first butted portion J1 with the rotary tool F. In the embodiment, the first primary joining process where the first region R1 (refer to FIG. 3) of the first butted portion J1 is joined and the second primary joining process where the second region R2 (refer to FIG. 3) of the first butted portion J1 is joined are respectively performed.

As shown in FIG. 6, the rotary tool F is composed of a connecting portion F1 and the stirring pin F2. The rotary tool F is made of, for example, tool steel. The connecting portion F1 is a portion to be connected to a rotary shaft of a friction stir device (not shown). Furthermore, the connecting portion F1 has a column shape, and has a thread hole (not shown) into which a bolt is fastened.

The stirring pin F2 hangs down from and is coaxial with the connecting portion F1. The stirring pin F2 has a smaller diameter with increasing distance from the connecting portion F1. The stirring pin F2 has a flat face F3 at the tip thereof.

The stirring pin F2 has a spiral groove formed on the outer circumferential face thereof In the embodiment, since the rotary tool F is rotated clockwise, the spiral groove is formed to rotate counterclockwise with increasing distance from the base end toward the tip. In other words, the spiral groove is formed to rotate counterclockwise with increasing distance from the base end toward the tip when it is viewed from the upper side.

Note that, in a case where the rotary tool F is rotated counterclockwise, it is preferable that the spiral groove is formed to rotate clockwise with increasing distance from the base end toward the tip. In other words, the spiral groove of this case is formed to rotate clockwise with increasing distance from the base end toward the tip when it is viewed from the upper side. By forming the spiral groove in such a manner, plastically fluidized metal formed by friction stirring is led toward the tip of the stirring pin F2 through the spiral groove. By this, the amount of metal to leak out of the metal members to be joined (the jacket body 2 and the sealing body 3) can be reduced.

As shown in FIG. 5A, in the first primary joining process, three sections of an insertion section, an original section and a leaving section are frictionally stirred continuously. The insertion section is a section which is to a middle point S1 from a starting position SP1. The original section is a section which is from the middle point S1 to the other middle point S2, the points S1 and S2 being on the set moving track L1. The leaving section is a section which is to an ending position EP1 from the other middle point S2. Furthermore, the middle points S1 and S2 are set at positions at which the middle line X1 and the set moving track L1 intersect. The starting position SP1 is set on an inner side relative to the set moving track L1 on a front face 3a of the sealing body 3. In the embodiment, the starting position SP1 is set at a position where an angle defined by a line segment connecting the starting position SP1 and the middle point S1 and the set moving track L1 in the first region R1 (refer to FIG. 3) is an obtuse angle.

Figure 5B:
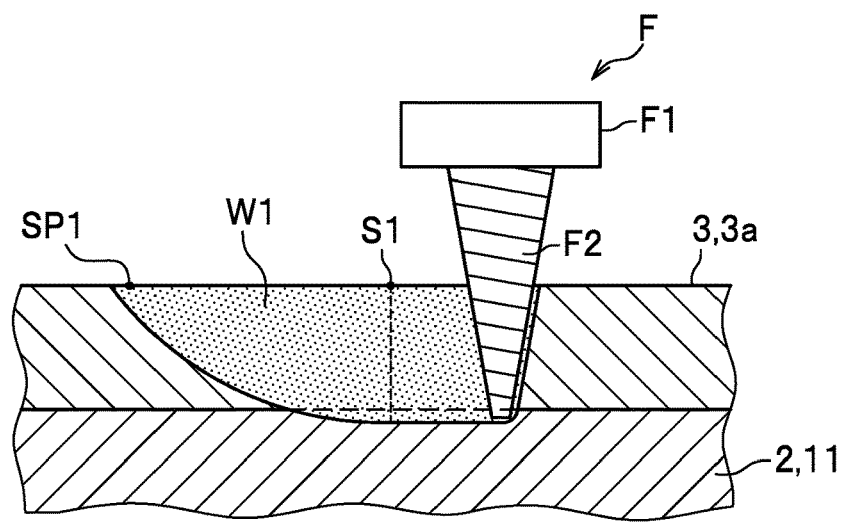
FIG. 5B is a cross sectional view showing the first primary joining process of the method for manufacturing the liquid-cooling jacket according to the first embodiment.

As shown in FIG. 5A, in the insertion section in the first primary joining process, friction stirring is performed from the starting position SP1 to the middle point S1. In the insertion section, the stirring pin F2 being rotated clockwise is inserted into the starting position SP1, and moved to the middle point S1. In this case, as shown in FIG. 5B, the stirring pin F2 is gradually inserted so that it reaches a "predetermined depth" set beforehand at least by the time it reaches the middle point S1. That is, the rotary tool F is gradually lowered while the rotary tool F is being moved to the set moving track L1 without keeping at one position.

After the stirring pin F2 reaches the middle point S1, the stirring pin F2 continuously shifts to the original section for friction stir welding. As shown in FIGS. 5A and 6, in the original section, the rotary tool F is moved so that the axis C of the stirring pin F2 is overlapped with the set moving track L1. In the original section, the "predetermined depth" for the stirring pin F2 is set to such an extent that the flat face F3 of the stirring pin F2 is slightly in contact with the step bottom face 12a. Note that, the "predetermined depth" for the stirring pin F2 may be appropriately set, for example, may be set to a depth not to reach the step bottom face 12a.

In the original section in the first primary joining process as shown in FIG. 6, the set moving track L1 is set so that an outer circumferential face of the stirring pin F2 is slightly in contact with the step side face 12b. Here, a contact dimension of the outer circumferential face of the stirring pin F2 against the step side face 12b is referred to as offset amount N. In a case where the flat face F3 of the stirring pin F2 is inserted deeper than the step bottom face 12a of the peripheral wall step portion 12, and the outer circumferential face of the stirring pin F2 is brought in contact with the step side face 12b like the present embodiment, the offset amount N is set in a range $0<N\le 1.0$ mm, preferably set in a range $0<N\le 0.85$ mm, further preferably set in a range $0<N\le 0.65$ mm.

In a case where the offset amount N is set so that the outer circumferential face of the stirring pin F2 is not brought in contact with the step side face 12b, the joining strength of the first butted portion J1 is lowered. Further, in a case where the offset amount N defined by the outer circumferential face of the stirring pin F2 and the step side face 12b is larger than 1.0 mm, a large amount of the first aluminum alloy of the jacket body 2 is mixed into the sealing body 3 side, so that there is a risk of a poor joining.

Figure 7A:
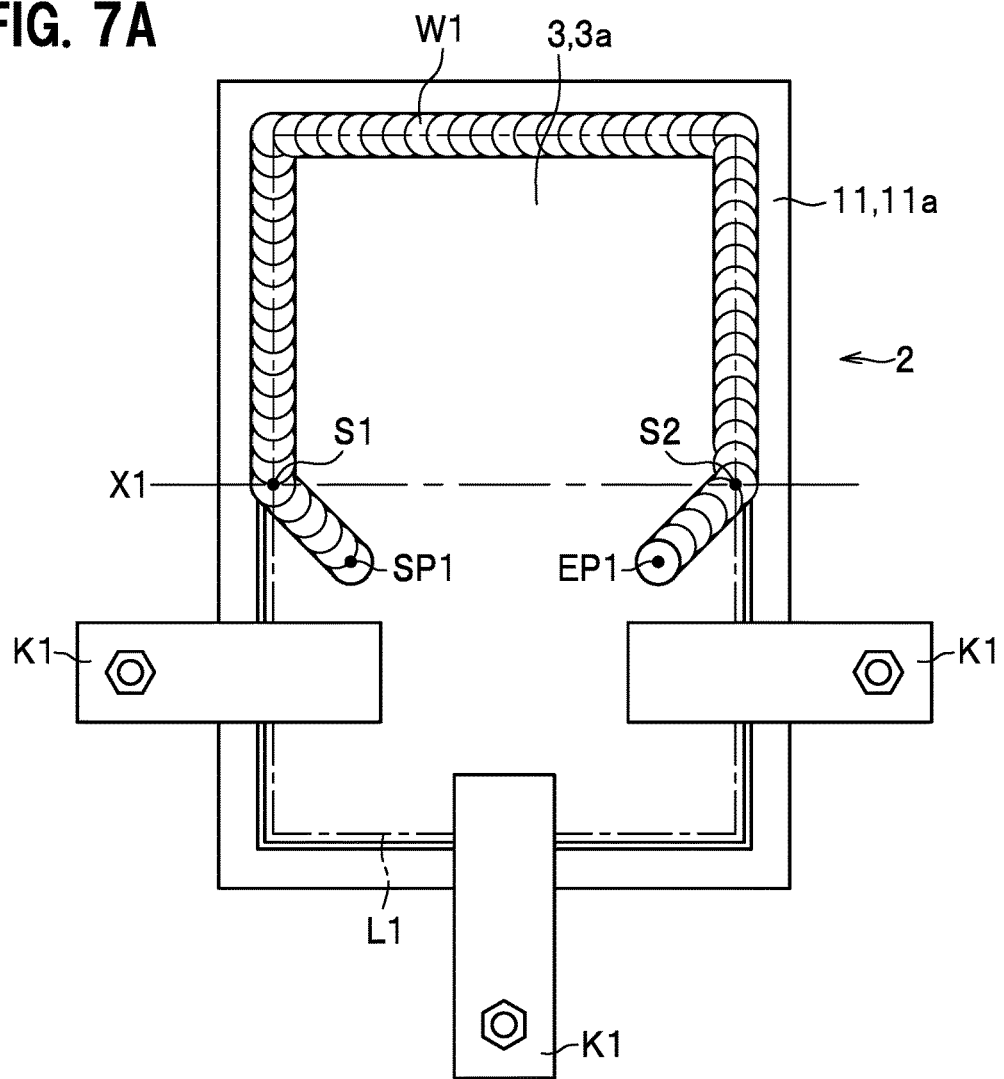
FIG. 7A is a plan view showing the first primary joining process of the method for manufacturing the liquid-cooling jacket according to the first embodiment.
Figure 7B:
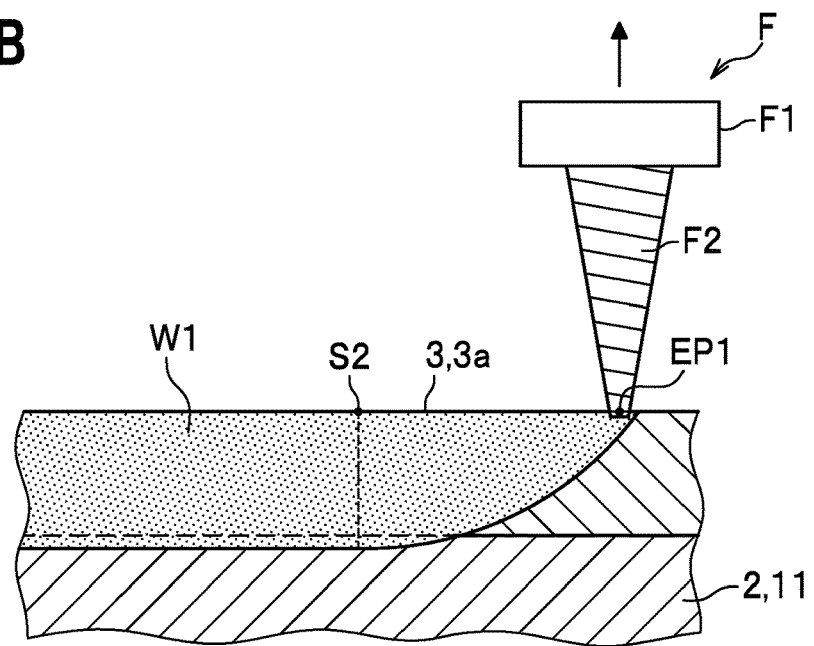
FIG. 7B is a cross sectional view showing the first primary joining process of the method for manufacturing the liquid-cooling jacket according to the first embodiment.

As shown in FIG. 7A, after the stirring pin F2 reaches the other middle point S2, the stirring pin F2 continuously shifts to the leaving section. In the leaving section, as shown in FIG. 7B, the stirring pin F2 is gradually moved upward while the stirring pin F2 is moved to the ending position EP1 from the other middle point S2, and the stirring pin F2 is made to leave the sealing body 3 at the ending position EP1. That is, the rotary tool F is gradually moved upward while the rotary tool F is moved to the ending position EP1 without keeping at some position. The ending position EP1 is set at a position where an angle defined by a line segment connecting the ending position EP1 and the other middle point S2 and the set moving track L1 in the first region R1 (refer to FIG. 3) is an obtuse angle. A plasticized region W1 is formed along the moving track of the rotary tool F.

Figure 8:
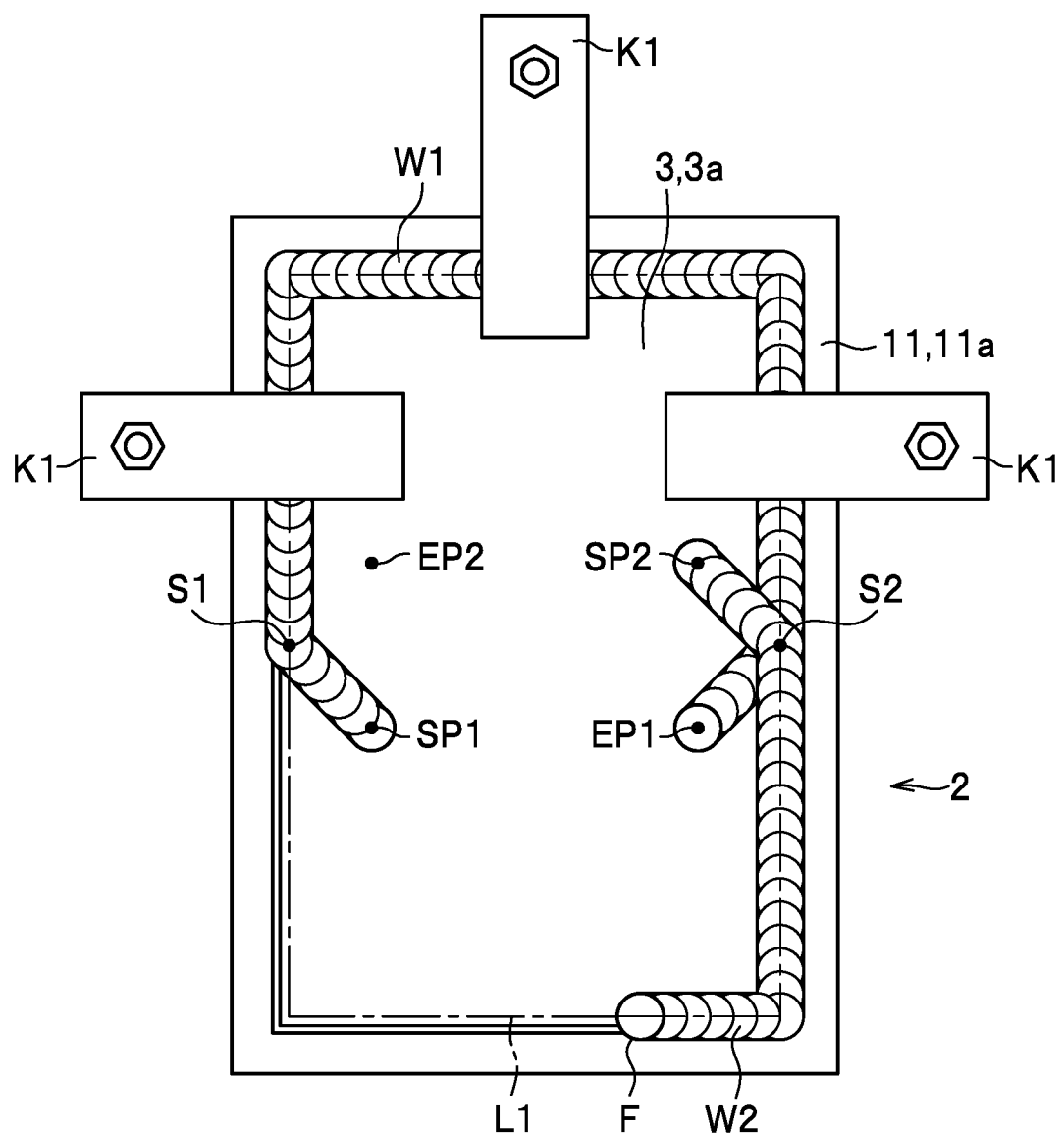
FIG. 8 is a plan view showing a second primary joining process of the method for manufacturing the liquid-cooling jacket according to the first embodiment.

After the first primary joining process is performed, the clamps K1 are temporarily released, and as shown in FIG. 8, the jacket body 2 and the sealing body 3 in the first region R1 (refer to FIG. 3) are immovably clamped with the three clamps K1.

The second primary joining process is a process to perform friction stir welding to the first butted portion J1 in the second region R2 (refer to FIG. 3). As shown in FIG. 8, in the second primary joining process, three sections of an insertion section, an original section and a leaving section are frictionally stirred continuously. The insertion section is a section which is to the other middle point S2 from a starting position SP2. The original section is a section which is to the middle point S1 from the other middle point S2, the points S1 and S2 being on the set moving track L1. The leaving section is a section which is to an ending position EP2 from the middle point S1. The starting position SP2 is set on an inner side relative to the set moving track L1 on the front face 3a of the sealing body 3. In the embodiment, the starting position SP2 is set at a position where an angle defined by a line segment connecting the starting position SP2 and the other middle point S2 and the set moving track L1 in the second region R2 (refer to FIG. 3) is an obtuse angle.

As shown in FIG. 8, in the insertion section in the second primary joining process, friction stirring is performed from the starting position SP2 to the other middle point S2. In the insertion section, the stirring pin F2 being rotated clockwise is inserted into the starting position SP2, and moved to the other middle point S2. In this case, the stirring pin F2 is gradually inserted to reach the "predetermined depth" set beforehand at least by the time it reaches the other middle point S2.

After the stirring pin F2 reaches the other middle point S2, the stirring pin F2 continuously shifts to the original section for friction stir welding. As shown in FIG. 8, in the original section, the rotary tool F is moved so that the axis C of the stirring pin F2 is overlapped with the set moving track L1. In the original section in the second primary joining process, friction stirring is performed in the same manner as that in the original section in the first primary joining process.

After the stirring pin F2 reaches the middle point S1, the stirring pin F2 continuously shifts to the leaving section. In the leaving section, the stirring pin F2 is gradually moved upward while the stirring pin F2 is moved to the ending position EP2 from the middle point S1, and the stirring pin F2 is made to leave the sealing body 3 at the ending position EP2. The ending position EP2 is set at a position where an angle defined by a line segment connecting the ending position EP2 and the middle point S1 and the set moving track L1 in the second region R2 (refer to FIG. 3) is an obtuse angle. A plasticized region W2 is formed along the moving track of the rotary tool F.

According to the method for manufacturing a liquid-cooling jacket of the embodiment, the second aluminum alloy on the sealing body 3 side in the first butted portion J1 is mainly stirred to be plastically fluidized because of frictional heat generated by the friction between the sealing body 3 and the stirring pin F2. Thus, the step side face 12b and the outer peripheral side face 3c of the sealing body 3 in the first butted portion J1 are joined together. Furthermore, since the outer circumferential face of the stirring pin F2 is slightly brought in contact with the step side face 12b of the jacket body 2, the mixing amount of the first aluminum alloy into the sealing body 3 from the jacket body 2 can be reduced as much as possible. Thus, in the first butted portion J1, the second aluminum alloy on the sealing body 3 side is mainly frictionally stirred. For this reason, the joining strength can be suppressed from lowering. That is, in the primary joining process, the unbalance between one side and the other side with respect to the axis C of the stirring pin F2, the unbalance being caused by material resistances to the stirring pin F2, can be reduced as much as possible. Thus, plastically fluidized materials are frictionally stirred in the well balanced state. Therefore, the joining strength can be suppressed from lowering. Further, metal shortage of the joined portion can be prevented by increasing the thickness of the sealing body 3.

In the insertion sections in the first and the second primary joining processes, the stirring pin F2 is gradually inserted to the predetermined depth while the rotary tool F is moved to positions to overlap with the set moving track L1 from the starting positions SP1, SP2. Thus, excessive frictional heat which is generated when the rotary tool F stops on the set moving track L1 is prevented from being generated.

Similarly, in the leaving sections in the first and the second primary joining processes, the stirring pin F2 is gradually pulled upward from the predetermined depth while the rotary tool F is moved to the ending positions EP1, EP2 from the set moving track L1, and is made to leave. Thus, excessive frictional heat to be generated when the rotary tool F stops on the set moving track L1 is prevented from being generated.

Thanks to the above, frictional heat is prevented from being generated too much on the set moving track L1, and a poor joining which is caused by excessive mixing of the first aluminum alloy into the sealing body 3 from the jacket body 2 is prevented from being generated.

Furthermore, by performing friction stir welding in the state that the stirring pin F2 is slightly in contact with both the step side face 12b and the step bottom face 12a, the first butted portion J1 and the second butted portion J2 can be reliably joined. Furthermore, since the stirring pin F2 is slightly brought in contact with the step side face 12b and the step bottom face 12a, the mixing amount of the first aluminum alloy into the sealing body 3 from the jacket body 2 can be reduced as much as possible.

In the primary joining process, the starting positions SP1, SP2 may be appropriately set. By setting the positions so that an angle between each of the lines through the starting positions SP1, SP2 and the set moving track L1 is obtuse, the rotary tool F smoothly shifts to the original section without lowering of the moving speed of the rotary tool F at the middle points S1, S2. Thus, excessive frictional heat to be generated by stopping or lowering of the moving speed of the rotary tool F on the set moving track L1 is prevented from being generated.

In the primary joining process of the embodiment, a rotational direction and a moving (advancing) direction of the rotary tool F may be appropriately set, but are set as follows. A rotational direction and a moving (advancing) direction of the rotary tool F is set so that within the plasticized region W1 formed along the moving track of the rotary tool F, the jacket body 2 side is a shear side, and the sealing body 3 side is a flow side. By setting the jacket body 2 side to be a shear side, stirring action around the first butted portion J1 due to the stirring pin F2 is enhanced, so that temperature rise in the first butted portion J1 can be expected. Therefore, in the first butted portion J1, the step side face 12b and the outer peripheral side face 3c of the sealing body 3 can be reliably joined together.

Note that, a shear side (Advancing side) means a side where a relative speed of the outer peripheral speed of the rotary tool relative to a portion to be joined is a speed obtained by adding a moving speed of the rotary tool and a tangential speed of the outer periphery of the rotary tool. On the other hand, a flow side (Retreating side) means a side where a relative speed of the outer peripheral speed of the rotary tool relative to the portion to be joined is a lower speed because the rotary tool is rotated in the direction opposite to the moving direction of the rotary tool.

The first aluminum alloy of the jacket body 2 is of a harder material than the second aluminum alloy of the sealing body 3. For this reason, the durability of the liquid-cooling jacket 1 can be enhanced. It is preferable that the first aluminum alloy of the jacket body 2 is of an aluminum alloy casting material and the second aluminum alloy of the sealing body 3 be of an aluminum alloy expansible material. In a case where the first aluminum alloy is of, for example, the aluminum alloy casting material based on Al—Si—Cu such as JISH5302 ADC12, castability, strength and machinability of the jacket body 2 can be enhanced. And in a case where the second aluminum alloy is of, for example, a material based on JIS A1000 or A6000, workability and thermal conductivity of the jacket body 2 can be enhanced.

In the case where the set moving track L1 in the primary joining process is a closed track as in the embodiment, there is a problem that the work is complicated since the rotary tool F and the clamps K1 interfere with each other when the primary joining process is performed. However, in the embodiment, friction stir welding is efficiently performed since a position to be clamped and a position to be frictionally stirred in the first primary joining process and those in the second primary joining process are changed.

In the primary joining process, since friction stir welding is performed to all around the first butted portion J1 in the first and second primary joining processes, airtightness and watertightness of the liquid-cooling jacket can be enhanced. Furthermore, for example, the leaving process may be performed so that the rotary tool F faces the ending position EP2 after the rotary tool F passes over the middle point S1 in an ending portion of the second primary joining process. That is, the plasticized region W1 formed through the first primary joining process and the plasticized region W2 formed through the second primary joining process are overlapped at respective end portions, thus, the airtightness and the watertightness can be more enhanced.

And furthermore, in the case where the inclination angle α of the stirring pin F2 and the inclination angle β of the step side face 12b are the same (parallel) as each other, the stirring pin F2 can be brought in uniform contact with the whole of the step side face 12b in the height direction thereof. Thus, friction stir welding can be performed in a balanced manner.

Furthermore, in the primary joining process, friction stirring is performed in the state that a base portion of the stirring pin F2 of the rotary tool F is exposed, so that the load to be acted on the friction stir device can be reduced.

Note that, in the primary joining process, the rotational speed of the rotary tool F may be constant or variable. In the insertion section in the first primary joining process, the rotational speed of the rotary tool F at the starting position SP1 is referred to as V1, and the rotational speed of the rotary tool F between the middle points S1 and S2 is referred to as V2. The speed V1 may be larger than the speed V2. The speed V2 is a constant rotational speed preset for the set moving track L1. That is, the rotational speed may be set to be higher at the starting position SP1, and the rotary tool F shifts to the original section while it is gradually reduced within the insertion section.

Further, in the leaving section in the first primary joining process, the rotational speed of the rotary tool F between the middle points S1 and S2 is referred to as V2, and the rotational speed of the rotary tool F when the rotary tool F is made to leave at the ending position EP1 is referred to as V3. The speed V3 may be larger than the speed V2. That is, the rotary tool F may leave the sealing body 3 while the rotational speed is gradually increased toward the ending position EP1 after the rotary tool shifts to the leaving section. By setting the rotational speed in the above-mentioned manner when the rotary tool F is inserted into the sealing body 3 or made to leave the same, a little insertion force can be compensated by the rotational speed. Therefore, friction stirring can be appropriately performed. It is the same as also in the second primary joining process or in other embodiments that the rotational speed of the rotary tool F may be variable in the insertion process or in the leaving process.

Second Embodiment

Figure 9:
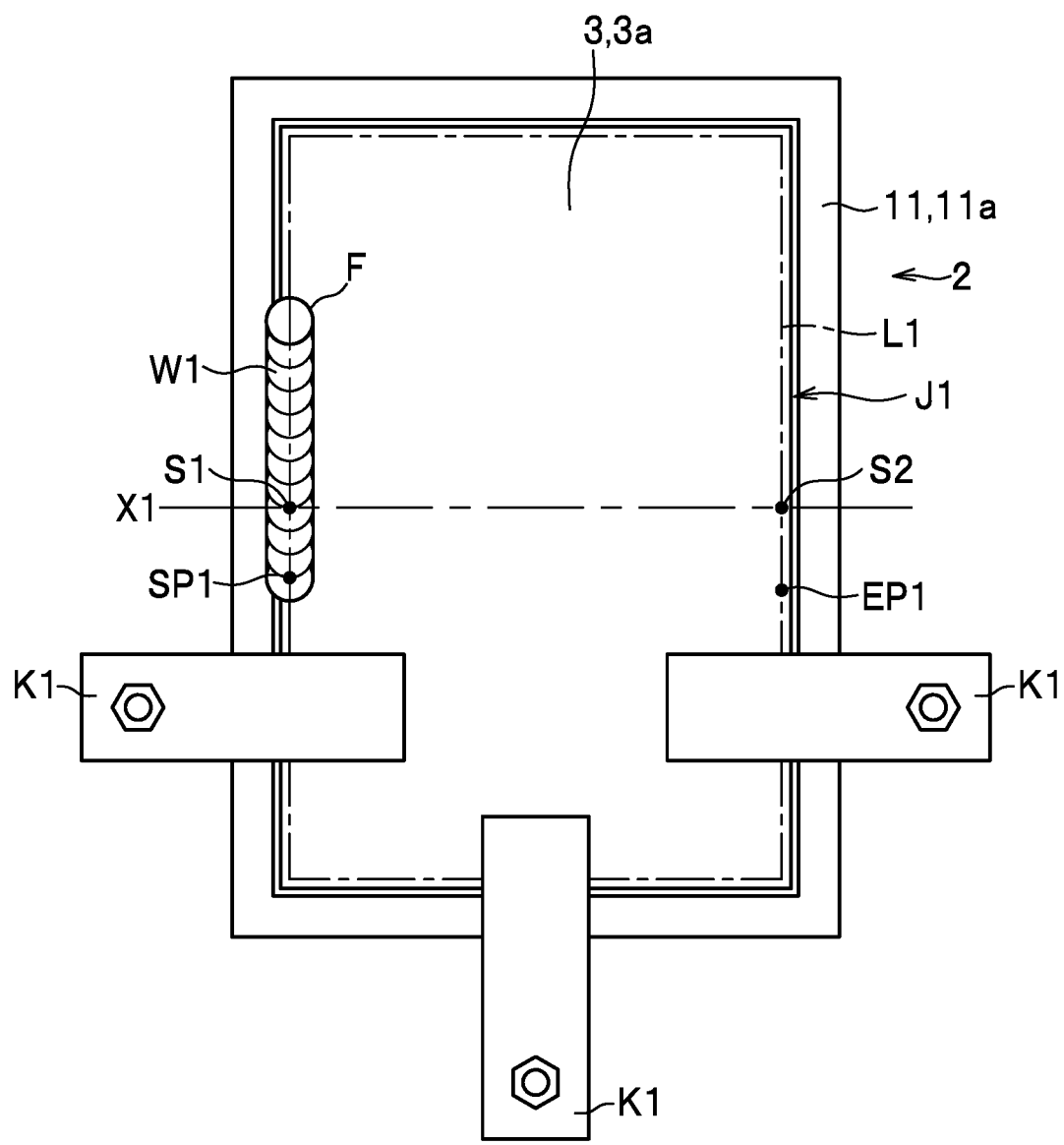
FIG. 9 is a plan view showing a first primary joining process of a method for manufacturing a liquid-cooling jacket according to a second embodiment of the present invention.

Next, a method for manufacturing a liquid-cooling jacket according to a second embodiment of the present invention will be described. As shown in FIG. 9, in the second embodiment, starting positions SP1, SP2 and ending positions EP1, EP2 in a primary joining process differ from in the first embodiment. In the second embodiment, differences from the first embodiment will be mainly described.

In the method for manufacturing a liquid-cooling jacket according to the second embodiment of the present invention, a preparation process, a placing process and the primary joining process are performed. The preparation process and the placing process are the same as in the first embodiment.

In the primary joining process, a first primary joining process and a second primary joining process are performed. In the first primary joining process, friction stir welding is performed to the first region R1 (refer to FIG. 3) of the first butted portion J1. In the second primary joining process, friction stir welding is performed to the second region R2 (refer to FIG. 3) of the first butted portion J1. As shown in FIG. 9, in the first primary joining process of this embodiment, the starting position SP1 is set at a position on the set moving track L1 on the second region R2 (refer to FIG. 3) side with respect to the middle point S1. And, in the second primary joining process of this embodiment, the ending position EP1 is set at a position on the set moving track L1 on the second region R2 (refer to FIG. 3) side with respect to the other middle point S2.

In the first primary joining process, friction stirring is performed continuously to an insertion section, an original section and a leaving section. The insertion section is from the starting position SP1 to the middle point S1. The original section is from the middle point S1 to the other middle point S2, the points S1, S2 being on the set moving track L1. The leaving section is from the other middle point S2 to the ending position EP1. The middle points S1, S2 are set at positions at which the middle line X1 and the set moving track L1 intersect.

As shown in FIG. 9, in the insertion section in the first primary joining process, friction stirring is performed from the starting position SP1 to the middle point S1. In the insertion section, the stirring pin F2 being rotated clockwise is inserted into the starting position SP1, and moved to the middle point S1. In this case, the stirring pin F2 is gradually inserted to reach the "predetermined depth" set beforehand at least by the time it reaches the middle point S1.

Figure 10:
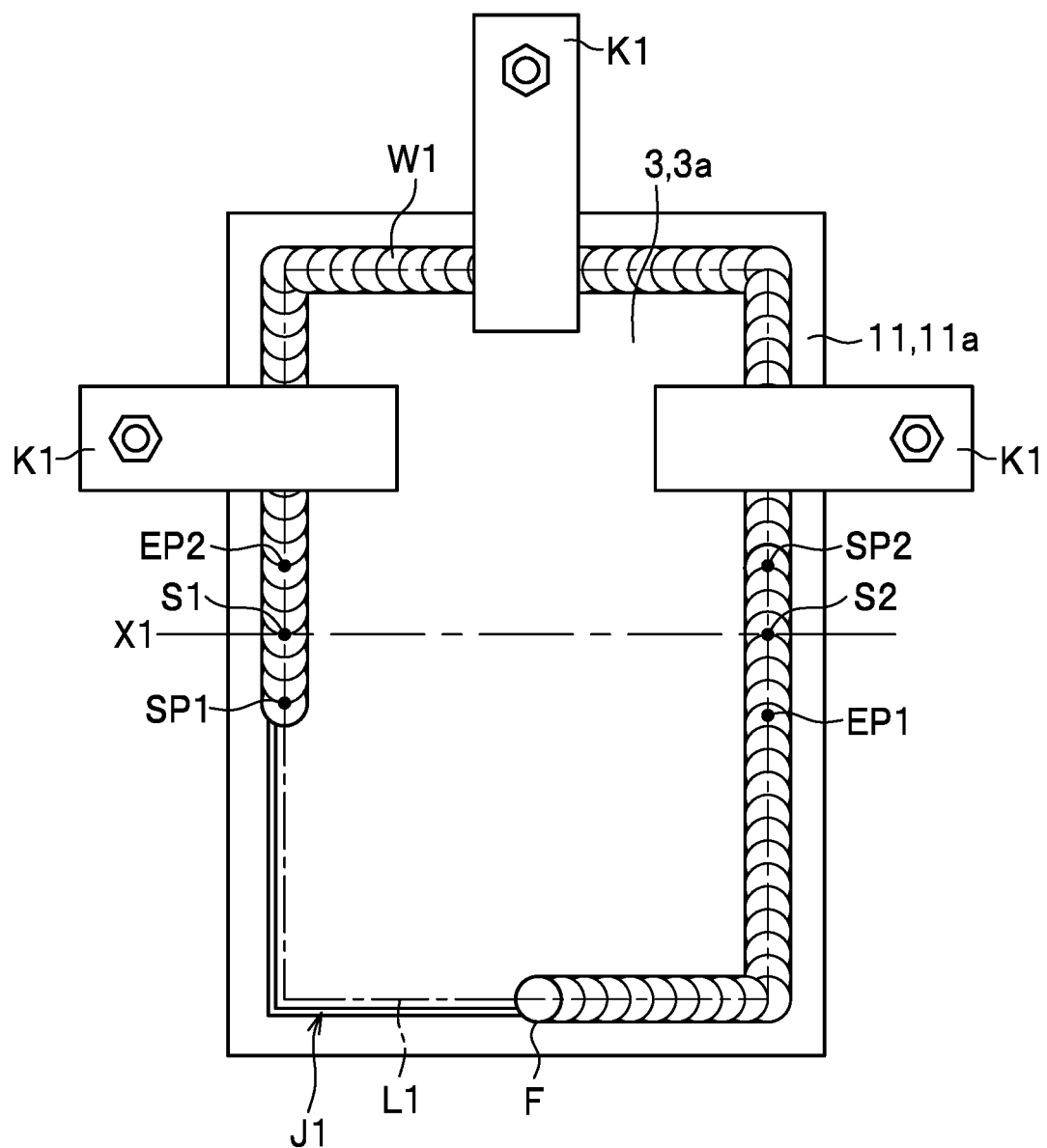
FIG. 10 is a plan view showing a second primary joining process of the method for manufacturing the liquid-cooling jacket according to the second embodiment.

The stirring pin F2 continuously shifts to the original section for friction stir welding when it reaches the middle point S1. In the original section, as shown in FIGS. 9, 10, in the original section, the rotary tool F is moved so that the axis C of the stirring pin F2 and the set moving track L1 are overlapped with each other. The contact dimension between the stirring pin F2 and the step side face 12b and the insertion depth of the stirring pin F2 are the same as those in the first embodiment.

The stirring pin F2 continuously shifts to the leaving section when it reaches the other middle point S2. In the leaving section, the stirring pin F2 is gradually moved upward while it moves from the middle point S2 to the ending position EP1, and at the ending position EP1 set at a position on the set moving track L1, the stirring pin F2 is made to leave the sealing body 3.

After the first primary joining process is performed, the clamps K1 are temporarily released. Then, as shown in FIG. 10, the jacket body 2 and the sealing body 3 in the first region R1 (refer to FIG. 3) are immovably clamped with the three clamps K1.

The second primary joining process is a process in which friction stir welding is performed to the first butted portion J1 in the second region R2 (refer to FIG. 3). As shown in FIG. 10, in the second primary joining process, friction stirring is performed continuously to an insertion section, an original section and a leaving section. The insertion section is from the starting position SP2 to the other middle point S2. The original section is from the other middle point S2 to the middle point S1, the points S1, S2 being on the set moving track L1. The leaving section is from the middle point S1 to the ending position EP2.

As shown in FIG. 10, in the second primary joining process of the embodiment, the starting position SP2 is set at a position on the set moving track L1 on the first region R1 (refer to FIG. 3) side with respect to the other middle point S2. Furthermore, in the second primary joining process of the embodiment, the ending position EP2 is set at a position on the set moving track L1 on the first region R1 side with respect to the middle point S1. That is, both the starting position SP2 and the ending position EP2 are set on the plasticized region W1.

In the insertion section in the second primary joining process, as shown in FIG. 10, friction stirring is performed to the section between the starting position SP2 and the other point S2. In the insertion section, the stirring pin F2 being rotated clockwise is inserted into the starting position SP2, and moved to the other middle point S2. In this case, the stirring pin F2 is gradually inserted to reach the "predetermined depth" set beforehand at least by the time it reaches the other middle point S2.

When reaching the other middle point S2, the stirring pin F2 continuously shifts to the original section for friction stir welding. As shown in FIG. 10, in the original section, the rotary tool F is moved so that the axis C of the stirring pin F2 is overlapped with the set moving track L1. In the original section in the second primary joining process, friction stirring is performed in the same manner as that in the original section in the first primary joining process.

When the stirring pin F2 reaches the middle point S1, it continuously shifts to the leaving section. In the leaving section, the stirring pin F2 is gradually moved upward while it moves to the ending position EP2 from the middle point S1, and made to leave the sealing body 3 at the ending position EP2.

By also the method for manufacturing the liquid-cooling jacket according to the second embodiment described above, almost the same effect as that in the first embodiment can be obtained. Starting positions SP1, SP2 and ending positions EP1, EP2 in the primary joining process may be set at a position on the set moving track L1 as in the second embodiment.

Third Embodiment

Figure 11:
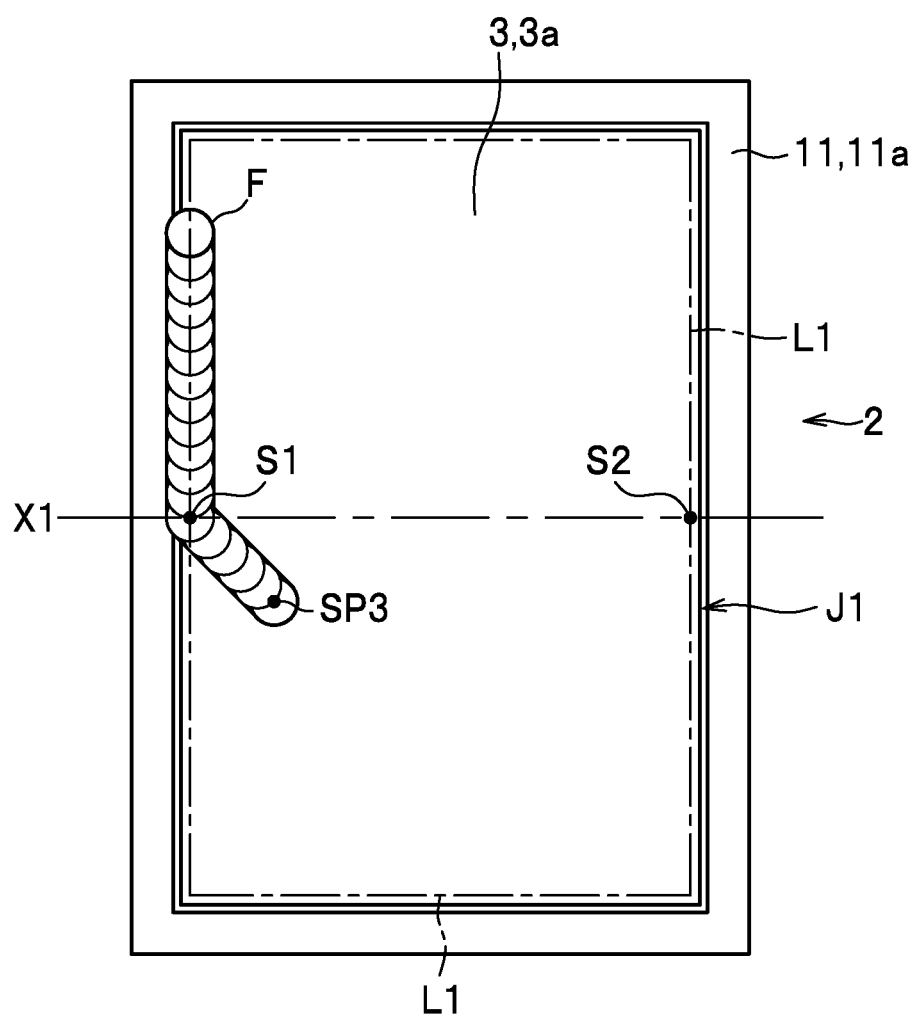
FIG. 11 is a plan view showing a primary joining process of a method for manufacturing a liquid-cooling jacket according to a third embodiment.
Figure 12:
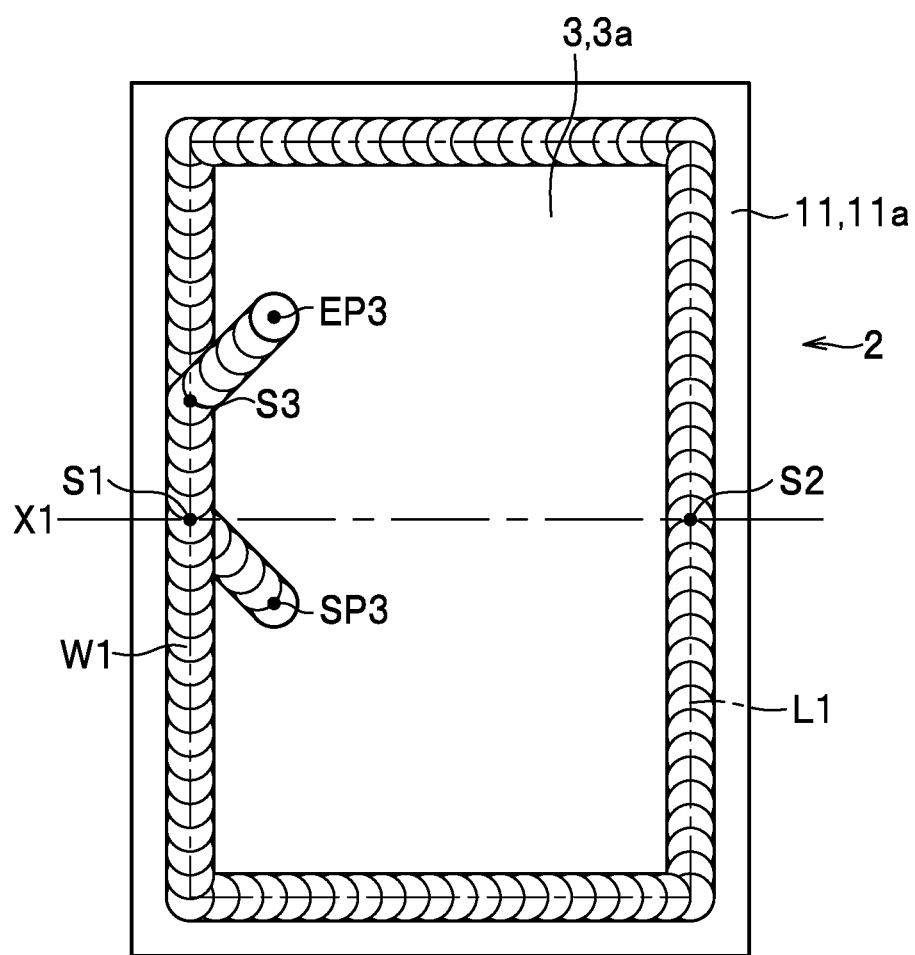
FIG. 12 is a plan view showing a state after the primary joining process of the method for manufacturing the liquid-cooling jacket according to the third embodiment.

Next, a method for manufacturing a liquid-cooling jacket according to a third embodiment of the present invention will be described. As shown in FIGS. 11, 12, the third embodiment differs from the previous embodiments in that a primary joining process is performed just in one process instead of dividing into two processes. In this embodiment, differences from the first embodiment will be mainly described.

In the method for manufacturing a liquid-cooling jacket according to the third embodiment, a preparation process, a placing process and a primary joining process are performed. The preparation process and the placing process are the same as those in the first embodiment. In the primary joining process, the rotary tool F being rotated clockwise is inserted into the starting position SP3, and friction stir welding is performed to the first butted portion J1.

As shown in FIGS. 11, 12, in the primary joining process, friction stirring is performed continuously to an insertion section, an original section and a leaving section. The insertion section is from the starting position SP1 to the middle point S1. The original section is from the middle point S1 on the set moving track L1 to a reference point S3 on the set moving track L1 over one round around the sealing body 3. The leaving section is from the reference point S3 to an ending position EP3. The middle point S1 is set at the position at which the middle line X1 and the set moving track L1 intersect. The reference point S3 is set at a position on the set moving track L1 in the first region R1 (refer to FIG. 3).

The starting position SP3 is set at a position on an inner side relative to the set moving track L1 on the front face 3a of the sealing body 3. In the embodiment, the starting position SP3 is set at a position where an angle defined by a line segment connecting the starting position SP3 and the middle point S1 and the set moving track L1 in the first region R1 (refer to FIG. 3) is an obtuse angle.

As shown in FIG. 11, in the insertion section in the first primary joining process, friction stirring is performed from the starting position SP3 to the middle point S1. In the insertion section, the stirring pin F2 being rotated clockwise is inserted into the starting position SP3, and moved to the middle point S1. In this case, the stirring pin F2 is gradually inserted to reach the "predetermined depth" set beforehand at least by the time it reaches the middle point S1.

When reaching the middle point S1, the stirring pin F2 continuously shifts to the original section for friction stir welding. As shown in FIGS. 11, 12, in the original section, the rotary tool F is moved so that the axis C of the stirring pin F2 is overlapped with the set moving track L1. The contact dimension between the stirring pin F2 and the step side face 12b and the insertion depth of the stirring pin F2 are the same as those in the first embodiment.

When the rotary tool F is moved over one round around the sealing body 3 to reach the reference point S3 after passing the middle point S1, it continuously shifts to the leaving section. In the leaving section, the stirring pin F2 is gradually moved upward while it moves to the ending position EP3 from the reference point S3, and made to leave the sealing body 3 at the ending position EP3.

The method for manufacturing the liquid-cooling jacket according to the third embodiment described above also have almost the same effect as that in the first embodiment. And in the third embodiment, since friction stir welding can be finished in one process, workability can be enhanced.

Fourth Embodiment

Figure 13:
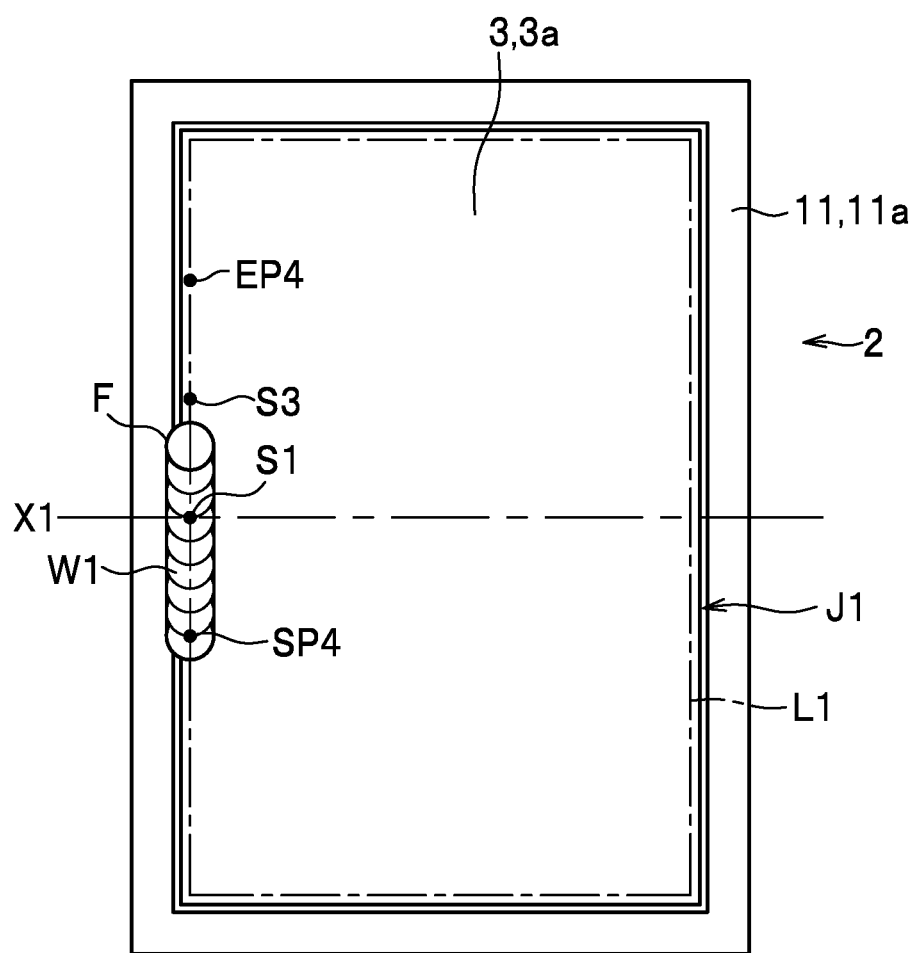
FIG. 13 is a plan view showing a primary joining process of a method for manufacturing a liquid-cooling jacket according to a fourth embodiment.
Figure 14:
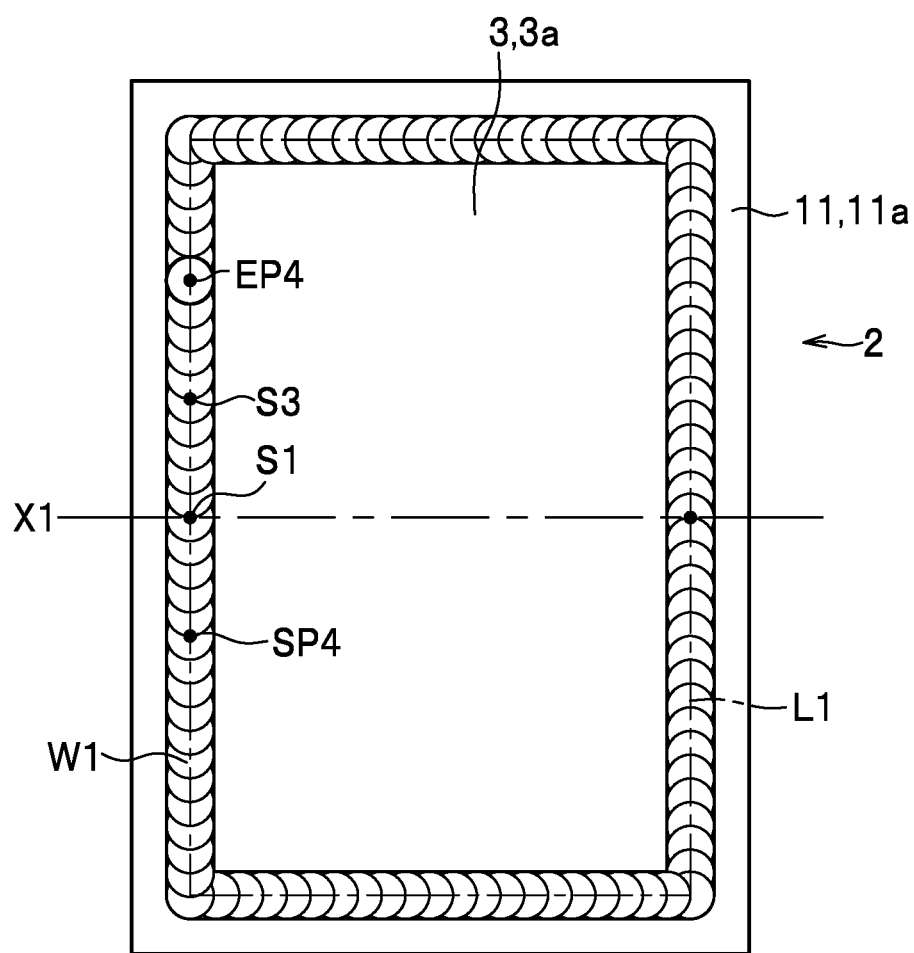
FIG. 14 is a plan view showing a state after the primary joining process of the method for manufacturing the liquid-cooling jacket according to the fourth embodiment.

Next, a method for manufacturing a liquid-cooling jacket according to a fourth embodiment of the present invention will be described. As shown in FIGS. 13, 14, the fourth embodiment differs from the second embodiment in that a primary joining process is performed just in one process instead of dividing into two processes. In this embodiment, differences from the second embodiment will be mainly described.

In the method for manufacturing a liquid-cooling jacket according to this embodiment, a preparation process, a placing process and a primary joining process are performed. The preparation process and the placing process are the same as those in the previous embodiments. In the primary joining process, the rotary tool F being rotated clockwise is inserted into a starting position SP4, and friction stir welding is performed to the first butted portion J1.

As shown in FIG. 13, in a first primary joining process of this embodiment, the starting position SP4 is set at a position on the set moving track L1 on the second region R2 (refer to FIG. 3) side with respect to the middle point S1. Furthermore, an ending position EP4 is set at a position on the set moving track L1 on the first region R1 (refer to FIG. 3) side with respective to the middle point S1.

As shown in FIG. 13, in the primary joining process, friction stirring is performed continuously to an insertion section, an original section and a leaving section. The insertion section is from the starting position SP4 to the middle point S1. The original section is from the middle point S1 on the set moving track L1 to a reference point S3 on the set moving track L1 over one round around the sealing body 3. The leaving section is from the reference point S3 to the ending position EP4. The reference point S3 is set at a position on the set moving track L1 on the second region R2 (refer to FIG. 3) side with respect to the middle point S1.

As shown in FIG. 13, in the insertion section in the primary joining process, friction stirring is performed from the starting position SP4 to the middle point S1. In the insertion section, the stirring pin F2 being rotated clockwise is inserted into the starting position SP4, and moved to the middle point S1. In this case, the stirring pin F2 is gradually inserted to reach the "predetermined depth" set beforehand at least by the time it reaches the middle point S1.

When reaching the middle point S1, the stirring pin F2 continuously shifts to the original section for friction stir welding. As shown in FIGS. 13, 14, in the original section, the rotary tool F is moved so that the axis C the stirring pin F2 is overlapped with the set moving track L1. The contact dimension between the stirring pin F2 and the step side face 12b and the insertion depth of the stirring pin F2 are the same as those in the second embodiment.

When the rotary tool F is moved over one round around the sealing body 3 and the stirring pin F2 reaches the reference point S3 after passing the middle point S1, it shifts to the leaving section as it is. In the leaving section, the stirring pin F2 is gradually moved upward while it moves to the ending position EP4 from the reference point S3, and made to leave the sealing body 3 at the ending position EP4.

The method for manufacturing the liquid-cooling jacket according to the fourth embodiment described above also have almost the same effect as that in the second embodiment. And in the fourth embodiment, since friction stir welding can be finished in one process, workability can be enhanced.

Figure 15:
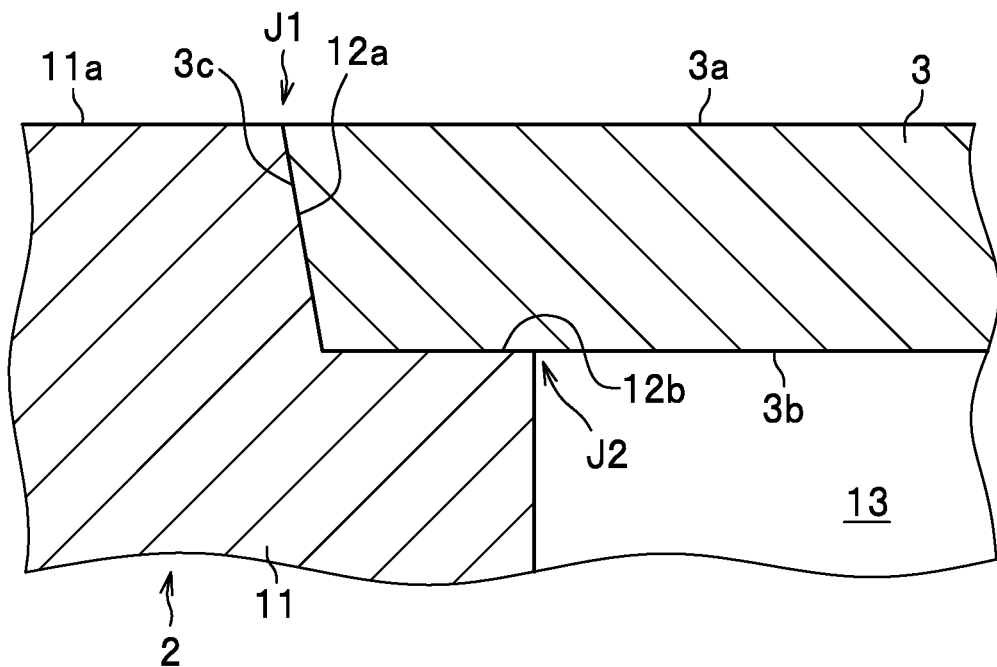
FIG. 15 is a cross sectional view showing a first modified example of the present invention.

In the above, embodiments of the present invention have been described, but they can be appropriately redesigned within the scope of the present invention. As shown in FIG. 15, A placing process according to a first modified example of the present invention differs from the embodiments described above in that a butted portion is formed by bringing an outer peripheral side face 3c in surface contact with the step side face 12b. In this modified example, the outer peripheral side face 3c of the sealing body 3 is formed to slant outward, and butted against the step side face 12b in the placing process. Also in such a configure, almost the same effect as those in the above-described embodiments can be obtained. Note that, like this modified example, the thickness of the sealing body 3 may be set to be the same as the height of the step side face 12b, and thus a peripheral wall end face 11a can be flush with the front face 3a of the sealing body 3.

Figure 16:
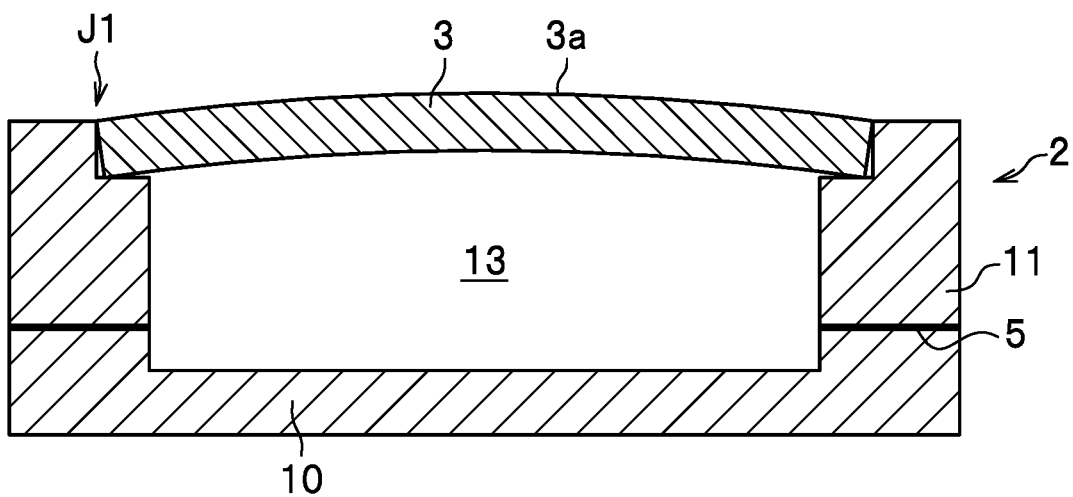
FIG. 16 is a cross sectional view showing a second modified example of the present invention.
Figure 17:
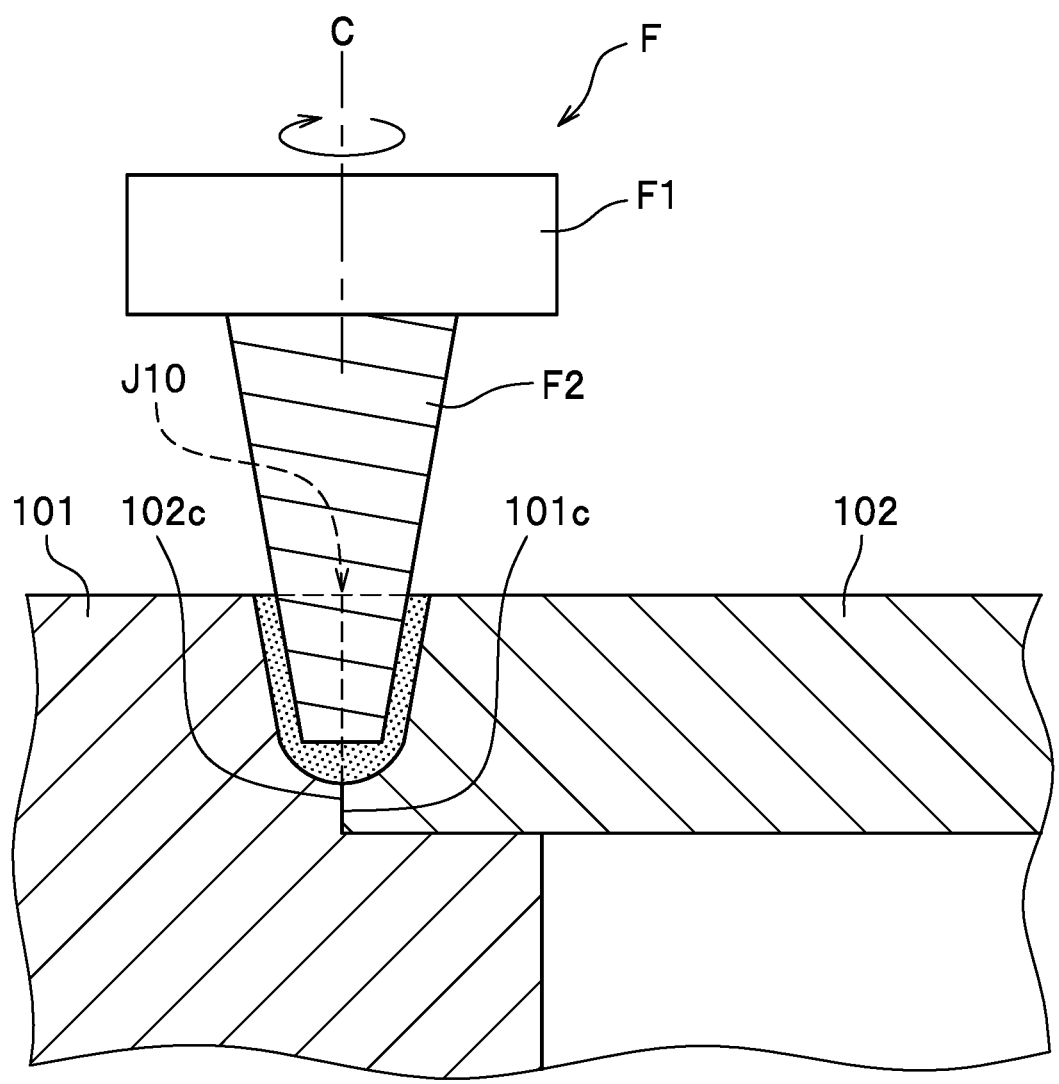
FIG. 17 is a cross sectional view showing a conventional method for manufacturing a liquid-cooling jacket.

As shown in FIG. 16, a placing process according to a second modified example of the present invention differs from the above-described embodiments in that the sealing body 3 is placed on the jacket body 2 in a curved state that the front face 3a side of the sealing body 3 is convex. There is a risk that the sealing body 3 warps concavely because of thermal contraction based on frictional heat generated by friction stir welding. However, by making the front face 3a side of the sealing body 3 convex beforehand like this modified example, the liquid-cooling jacket can be formed flatly by using the heat contraction. Note that, the jacket body 2 according to the second modified example of the present invention has a seal portion 5 having a frame shape formed in a portion of the peripheral wall portion 11. The jacket body 2 may be formed integrally by die-casting or formed by joining a frame part and a plate-like part with the seal portion 5 to integrate them.

In the embodiments, friction stirring is performed by separated two processes while clamping works are accompanied, but may be performed by one process, three processes or over three processes while clamping works are accompanied. Furthermore, before the primary joining process is performed, a provisional joining process, in which the jacket body 2 and the sealing body 3 are provisionally joined, may be performed. By this, opening between the jacket body 2 and the sealing body 3 can be prevented in the primary joining process. In the provisional joining process, friction stirring may be performed with use of a rotary tool for the provisional joining, or welding may be adopted. Further, in the insertion process and the leaving process, the moving track may be set so that a moving track of the rotary tool F is a curved line (for example, an arc) in a plan view. By this, shifting to the original process from the insertion process or shifting to the leaving process from the original process can be smoothly done.

REFERENCE SIGNS LIST 1 liquid-cooling jacket
2 Jacket body
3 Sealing body
F Rotary tool
F2 Stirring pin
F3 Flat face
J1 First butted portion
J2 Second butted portion
W Plasticized region

The invention claimed is:

1. A method for manufacturing a liquid-cooling jacket to be constituted by a jacket body and a sealing body, the jacket body having a bottom portion and a peripheral wall portion standing on a peripheral edge of the bottom portion, the sealing body sealing an opening portion of the jacket body, the method including joining the jacket body and the sealing body together by friction stirring, wherein the jacket body is made of a first aluminum alloy, and the sealing body is made of a second aluminum alloy, the first aluminum alloy having a higher hardness than the second aluminum alloy, and wherein an outer circumferential face of a stirring pin of a rotary tool to be used in the friction stirring has a tapered shape in which a diameter of the stirring pin is reduced toward an end of the stirring pin, the method comprising:

a preparation process to form a peripheral wall step portion having a step bottom face and a step side face standing on the step bottom face toward the opening portion along an inner peripheral edge of the peripheral wall portion;

a placing process to place the sealing body on the jacket body to form a first butted portion where an outer peripheral side face of the sealing body is butted against the step side face of the peripheral wall step portion while forming a second butted portion where a back face of the sealing body and the step bottom face of the peripheral wall step portion are overlapped with each other; and a primary joining process to perform friction stirring to the first butted portion by moving the stirring pin of the rotary tool one round around the sealing body with a predetermined depth along a set moving route set at an inner position relative to the outer peripheral side face of the sealing body in a state that only the stirring pin of the rotary tool being rotated is inserted into the sealing body and that an outer face of the stirring pin is in contact with the step side face of the peripheral wall step portion with a contact dimension of an offset amount N where the offset amount N is greater than 0 mm and equal or less than 1 mm, wherein in the primary joining process, an ending position is set at a position on the set moving route, after friction stir welding is performed to the first butted portion, the stirring pin is gradually moved upward while the rotary tool is moved to the ending position, and the rotary tool is made to leave the sealing body at the ending position.

2. The method for manufacturing a liquid-cooling jacket according to claim 1, wherein in the primary joining process, friction stirring is performed while the stirring pin is rotated at a predetermined rotational speed, and wherein in the primary joining process, when the stirring pin is made to leave, the rotary tool is moved to the ending position while gradually increasing a rotational speed of the stirring pin from the predetermined rotational speed.

3. The method for manufacturing a liquid-cooling jacket according to claim 1, wherein in the preparation process, the peripheral wall step portion is formed to have the step bottom face and the step side face on the inner peripheral edge of the peripheral wall portion, the step side face obliquely standing on the step bottom face toward the opening portion and toward the outside.

4. The method for manufacturing a liquid-cooling jacket according to claim 1, wherein a thickness of the sealing body is set to be larger than a height dimension of the step side face of the peripheral wall step portion.

5. The method for manufacturing a liquid-cooling jacket according to claim 1, wherein in the preparation process, the jacket body is formed by die-casting and at least the sealing body is formed to have a convex front face.

6. The method for manufacturing a liquid-cooling jacket according to claim 1, further comprising a provisional process where provisional joining is performed to the first butted portion before the primary joining process.

* * * * *